United States Patent
Tse

(10) Patent No.: US 9,605,186 B2
(45) Date of Patent: Mar. 28, 2017

(54) ADHESIVE COMPOSITIONS OF ETHYLENE-BASED AND PROPYLENE-BASED POLYMERS

(71) Applicant: ExxonMobil Chemical Patents Inc., Baytown, TX (US)

(72) Inventor: Mun Fu Tse, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/428,137

(22) PCT Filed: Oct. 2, 2013

(86) PCT No.: PCT/US2013/062994
§ 371 (c)(1),
(2) Date: Mar. 13, 2015

(87) PCT Pub. No.: WO2014/105244
PCT Pub. Date: Jul. 3, 2014

(65) Prior Publication Data
US 2015/0225624 A1    Aug. 13, 2015

Related U.S. Application Data

(60) Provisional application No. 61/746,850, filed on Dec. 28, 2012.

(30) Foreign Application Priority Data

Apr. 2, 2013    (EP) .................................... 13161991

(51) Int. Cl.
*C09J 123/14*    (2006.01)
*C09J 123/08*    (2006.01)
*C08K 5/13*    (2006.01)

(52) U.S. Cl.
CPC ............. *C09J 123/142* (2013.01); *C08K 5/13* (2013.01); *C09J 123/0815* (2013.01); *C09J 123/14* (2013.01)

(58) Field of Classification Search
CPC .......... C09J 123/14; C09J 123/08; C08K 5/13
USPC ....................................................... 524/528
See application file for complete search history.

(56) References Cited

U.S. PATENT DOCUMENTS

| | | | |
|---|---|---|---|
| 4,078,132 | A | 3/1978 | Lepert |
| 5,171,793 | A | 12/1992 | Johnson et al. |
| 5,397,843 | A | 3/1995 | Lakshmanan |
| 5,530,054 | A | 6/1996 | Tse et al. |
| 5,548,014 | A | 8/1996 | Tse et al. |
| 5,571,867 | A | 11/1996 | Luvinh et al. |
| 6,207,748 | B1 | 3/2001 | Tse et al. |
| 2004/0106723 | A1 | 6/2004 | Yang et al. |
| 2004/0236042 | A1 | 11/2004 | Datta et al. |

FOREIGN PATENT DOCUMENTS

| | | |
|---|---|---|
| EP | 1295926 | 3/2003 |
| JP | H01144481 | 6/1989 |
| JP | 2008214539 | 9/2008 |
| WO | 91/07472 | 5/1991 |
| WO | 97/33921 | 9/1997 |
| WO | 98/03603 | 1/1998 |
| WO | 01/18109 | 3/2001 |
| WO | 03/025036 | 3/2003 |
| WO | 03/025037 | 3/2003 |
| WO | 03/025084 | 3/2003 |
| WO | 2006/090722 | 8/2006 |
| WO | 2010/026172 | 3/2010 |
| WO | 2011/022523 | 2/2011 |
| WO | 2012/149391 | 1/2012 |
| WO | 2012/051239 | 4/2012 |
| WO | WO 2012/051239 * | 4/2012 |
| WO | 2014/046834 | 3/2014 |

OTHER PUBLICATIONS

Bu, H.S, Cheng, S.Z.D, Wunderlich, B. , Makromol. Chem. Rapid Commun., 1988,9,75.
Wunderlich, B. , Macromolecular Physics, vol. 1, p. 388 (1973).
T.Sun, P. Brant, R.R.Chance, and W.W. Graessley, Macromolecules, vol. 34, No. 19, pp. 6812-6820, 2001.
Journal of Applied Polymer Science, vol. 100, pp. 1651-1658, 2006.

* cited by examiner

*Primary Examiner* — Jim J Seidleck
*Assistant Examiner* — Deve E Valdez
(74) *Attorney, Agent, or Firm* — Priya G. Prasad

(57) ABSTRACT

The present invention is related to adhesive compositions and their applications. In particular, the adhesive compositions described herein comprise an ethylene-based polymer and a propylene-based polymer with varying comonomer content.

14 Claims, No Drawings

ADHESIVE COMPOSITIONS OF ETHYLENE-BASED AND PROPYLENE-BASED POLYMERS

CROSS-REFERENCES TO RELATED APPLICATIONS

This application is a National Stage Application of International Application No. PCT/US2013/062994, filed Oct. 2, 2013, and claims the benefit of U.S. Provisional Application No. 61/746,850, filed Dec. 28, 2012, and EP Application No. 13161991.8, filed Apr. 2, 2013, the disclosures of which are hereby incorporated by reference in their entireties. This application is also related to U.S. Provisional Application Ser. No. 61/702,788, filed 19 Sep. 2012, entitled "Adhesive Compositions of Propylene-Based and Ethylene-Based Polymers."

FIELD OF THE INVENTION

The present invention pertains to adhesive compositions based on blends of ethylene-based (hereinafter, "$C_2$-based") polymers and propylene-based polymers and their applications. In particular, the invention pertains to adhesive compositions comprising, inter alia, $C_2$-based polymers having a Brookfield viscosity of at least 250 mPa·sec and a heat of fusion of less than about 250 J/g, and propylene-based polymers having a Brookfield viscosity in the range from 100 mPa·sec up to 1500 mPa·sec and a heat of fusion of at least 45 J/g, wherein Brookfield viscosity is measured by ASTM D-3236 and heat of fusion is measured by ASTM D-3418-03.

BACKGROUND OF THE INVENTION

Hot melt adhesives are thermoplastic materials that can be heated to a melt, and then applied to various substrates. A bond is formed upon cooling and resolidification of the melt. These hot melt adhesives have the drawback of often becoming brittle below the glass transition temperature. Historically, ethylene-based semi-crystalline polymers like polyethylene and ethylene vinyl acetate copolymer (EVA) have been used in various adhesive applications; however, such polymers have many problems in their end use applications. For example, semi-crystalline linear low density polyethylene (LLDPE) can be used in hot melt adhesive applications where the crystalline network formed on cooling makes a good adhesive free of tack, but the high level of crystallinity causes the material to be brittle. For this reason other monomers, such as vinyl acetate (VA) or alpha-olefins, are often co-polymerized with ethylene to break up some of the crystallinity and soften the adhesive. Thus, the use of ethylene-based hot melt adhesives with vinyl acetate comonomers is limited when low temperature conditions of use are desired.

PCT Publication Nos. WO 1997/33921 and WO 98/03603 teach the use of ethylene-based copolymers in hot melt adhesives and that these copolymers are useful in some applications, but suffer in that they have higher melt viscosity, hence poorer processing, due to higher chain entanglement density, poorer adhesion to low energy surfaces due to mismatched surface energy, and poorer cohesion due to lower glass transition temperature ($T_g$) than propylene-based copolymers. $T_g$ values of polyethylene and polypropylene are about −128° C. and −10° C., respectively. Generally, the observed strength or cohesion is governed by polymer chain segmental viscosity. Therefore, to compare the cohesion of two polymers the test temperature and polymer $T_g$ are normalized in order to minimize the contribution from differences in viscoelasticity.

U.S. Pat. No. 5,397,843 discloses blended polymer compositions comprising an admixture of (a) a copolymer of ethylene and an alpha-olefin and (b) an amorphous polypropylene, and/or amorphous polyolefin, or mixtures thereof, which have a crystallinity of less than 20 wt. %.

U.S. Pat. No. 5,548,014 discloses hot melt adhesives comprising a tackifier and a high weight average molecular weight ($M_W$), narrow molecular weight distribution (MWD), narrow CD (composition distribution) ethylene/alpha-olefin copolymer(s) and a low $M_W$, narrow MWD ethylene/alpha-olefin copolymer prepared with either supported or unsupported cyclopentadienyl derivatives of Group IV, and catalysts for applications in hot melt adhesives, particularly in automotive product assembly, packaging and food packaging.

U.S. Pat. Nos. 5,530,054 and 6,207,748 disclose hot melt adhesives comprising ethylene/alpha-olefin copolymers prepared with either supported or unsupported metallocene-alumoxane catalysts for hot melt adhesives applications in automotive product assembly, packaging and food packaging, wherein these ethylene copolymers have $M_W$ ranging from about 20,000 to about 100,000, and comonomer weight percent ranging from about 6 to about 30.

PCT Publication No. WO 97/33921 discloses adhesives and processes for preparing the same, comprising at least one first homogeneous ethylene/alpha-olefin interpolymer, and optionally at least one tackifier, and optionally at least one plasticizer.

PCT Publication No. WO 98/03603 discloses hot melt adhesives comprising at least one first homogeneous linear or substantially linear ethylene polymer having a particular density and melt viscosity at 350° F. (177° C.), and an optional wax and tackifier. In particular, disclosed is a hot melt adhesive characterized by: a) at least one first homogeneous linear or substantially linear interpolymer of ethylene with at least one $C_3$ to $C_{20}$ alpha-olefin interpolymer having a density from 0.850 g/cm$^3$ to 0.895 g/cm$^3$; b) optionally, at least one tackifying resin; and c) optionally, at least one wax wherein the hot melt adhesive has a viscosity of less than about 5000 cPs (50 grams/(cm·sec) or 5000 mPa·sec) at 150° C.

There is a need for improved adhesive compositions comprised of blends of $C_2$-based and propylene-based polymers, and processes or methods for making such compositions, which have important attributes from both types of polymers. Specifically, adhesive compositions comprised of $C_2$-based polymers having higher Brookfield viscosities and lower heat of fusion, and propylene-based polymers having Brookfield viscosities in a narrow range and higher or similar heat of fusion. This invention meets these and other needs.

SUMMARY OF THE INVENTION

The present invention is directed to adhesive compositions and hot melt adhesives and their commercial applications. In one or more embodiments, the adhesive compositions comprise a $C_2$-based polymer component comprising more than 50 wt. % of ethylene-derived units and at least one first comonomer, said $C_2$-based polymer having a Brookfield viscosity of at least 250 mPa·sec measured by ASTM D-3236 at 190° C. and a heat of fusion of less than about 250 J/g measured by ASTM D-3418-03, wherein the weight percent measurements are based on the weight of the $C_2$-based polymer. The compositions further comprise a propylene-based polymer component comprising more than 50 wt. % propylene-derived units and at least one second comonomer, said propylene-based polymer having a Brookfield viscosity in a range from 100 mPa·sec to 1500 mPa·sec measured by ASTM D-3236 at 190° C. and a heat of fusion of at least 45 J/g measured by ASTM D-3418-03, wherein the weight percent measurements are based on the weight of the propylene-based polymer. Each of said $C_2$-based polymer and said propylene based polymer has a characteristic time ($t_c$), which is defined below in Equation 1, of at least 0.1 nanoseconds. The at least one first comonomer and the at least one second comonomer are the same or different. The resulting adhesive compositions and hot melt adhesives exhibit reasonably low Brookfield viscosity, good set time value, and good fiber tear performance over a range of temperatures.

DETAILED DESCRIPTION OF THE INVENTION

Definitions

As used herein, the term "characteristic time" abbreviated as "$t_c$" in units of nanoseconds is defined by the following Equation 1:

$$t_c = \frac{BV}{\text{Density} \times \text{Heat of Fusion}} \quad \text{(Equation 1)}$$

wherein said BV is the Brookfield viscosity of said $C_2$-based polymer or said propylene-based polymer measured by ASTM D-3236 at 190° C. in units of mPa·sec, said Density is the density of said $C_2$-based polymer or said propylene-based polymer in units of g/cm$^3$ at 23° C., and said Heat of Fusion is the heat of fusion of said $C_2$-based polymer or said propylene-based polymer in units of J/g.

As used herein, the term "copolymer" is meant to include polymers having two or more monomers, optionally with other monomers, and may refer to interpolymers, terpolymers, etc. The term "polymer" as used herein includes homopolymers and copolymers.

Ethylene-Based Polymer Component

In one or more embodiments of the present invention, the adhesive compositions described herein comprise a $C_2$-based polymer component, which in turn may comprise one or more ethylene-based polymer(s). In one embodiment, the $C_2$-based polymer component comprises more than 50 wt. % ethylene-derived units and 1 wt. % to 49 wt. % of units derived from at least one first comonomer. The first comonomer is an alpha-olefin, and is preferably, propylene, 1-butene or 1-octene, or more preferably, octene. The first comonomer may be selected from the group consisting of propylene, a $C_4$ to $C_{20}$ alpha-olefin, and combinations thereof. In some embodiments, the $C_2$-based polymer component is a random copolymer and in other embodiments the $C_2$-based polymer component is an elastomeric random copolymer.

In some embodiments, the $C_2$-based polymers comprise units derived from ethylene and from about 1 wt. % to about 49 wt. %, or from about 5 wt. % to about 40 wt. %, of units derived from $C_3$ to $C_{10}$ alpha-olefins. In another embodiment, the first comonomer may comprise at least one $C_3$ to $C_8$ alpha-olefin. In one or more embodiments, the first comonomer units may derive from propylene, 1-butene, 1-hexene, 4-methyl-1-pentene, 1-octene, and/or 1-decene, preferably, 1-hexene or 1-octene. The embodiments described below are discussed with reference to propylene, butene or octene as the first comonomer, but the embodiments are equally applicable to other polymers with other alpha-olefin comonomers. In this regard, the polymer may simply be referred to as $C_2$-based polymers with reference to octene as the comonomer.

In one or more embodiments, the $C_2$-based polymers comprise at least about 1 wt. %, at least about 2 wt. %, at least about 3 wt. %, at least about 5 wt. %, at least about 6 wt. %, at least about 8 wt. %, or at least about 10 wt. % of at least one first comonomer selected from the group consisting of $C_3$ to $C_{20}$ alpha-olefins, and combinations thereof. Preferably, the $C_2$-based polymer comprises 51 wt. % to 99 wt. % of ethylene-derived units and 49 wt. % to 1 wt. % of octene-derived units, based on the weight of the $C_2$-based polymer. In those or other embodiments, the $C_2$-based polymers may include up to about 49 wt. %, or up to about 39 wt. %, or up to about 29 wt. %, or up to about 19 wt. %, or up to about 15 wt. %, or up to about 10 wt. %, or up to about 8 wt. %, or up to about 5 wt. %, or up to about 1 wt. % of at least one first comonomer selected from the group consisting of $C_3$ to $C_{20}$ alpha-olefin, preferably 1-octene, and combinations thereof, where the percentage by weight is based upon the total weight of the ethylene-derived and alpha-olefin derived units. Stated another way, the $C_2$-based polymers may include at least about 51 wt. %, or at least about 60 wt. %, or at least about 70 wt. %, or at least about 75 wt. %, or at least about 80 wt. %, or at least about 82 wt. %, or at least about 84 wt. %, or at least about 86 wt. %, or at least about 88 wt. %, or at least about 90 wt. % of ethylene-derived units; and in these or other embodiments, the $C_2$-based polymers may include up to about 99 wt. %, or up to about 98 wt. %, or up to about 97 wt. %, or up to about 95 wt. %, or up to about 94 wt. %, or up to about 92 wt. %, or up to about 90 wt. % of ethylene-derived units, where the percentage by weight is based upon the total weight of the ethylene-derived and ethylene-olefin derived units.

The $C_2$-based polymers of one or more embodiments are characterized by having a single melting temperature as determined by differential scanning calorimetry (DSC). The melting point is defined as the temperature of the greatest heat absorption within the range of melting of the sample. The $C_2$-based polymer may show secondary melting peaks adjacent to the principal peak, but for purposes herein, these secondary melting peaks are considered together as a single melting point, with the highest of these peaks being considered the melting point ($T_m$) of the $C_2$-based polymer.

In one or more embodiments, the $T_m$ of the $C_2$-based polymers (as determined by DSC) is less than about 110° C., or less than about 100° C., or less than about 90° C., or less than about 80° C., or less than about 70° C., or less than about 60° C., or less than about 50° C., or less than about 40° C., or less than about 30° C.

In one or more embodiments, the $C_2$-based polymers may be characterized by a heat of fusion ($H_f$), as determined by differential scanning calorimetry according to ASTM D-3418-03. In one or more embodiments, the heat of fusion of the $C_2$-based polymer is less than about 250 J/g, or less than about 200 J/g, or less than about 150 J/g, or less than about 100 J/g. In other embodiments, the heat of fusion is in the range from any lower limit of about 1 J/g, or 10 J/g, or 20 J/g, or 30 J/g, or 40 J/g, or 50 J/g, or 60 J/g, up to any upper limit of about 250 J/g, or 225 J/g, or 200 J/g, or 175 J/g, or 150 J/g, or 125 J/g, or 100 J/g. Preferably, the heat of fusion of the $C_2$-based polymer is from about 1 J/g to about 100 J/g, or from about 1 J/g to about 150 J/g, or from about 1 J/g to about 200 J/g, or from about 1 J/g to about 250 J/g. More preferably, the heat of fusion of the $C_2$-based polymer is in the range from about 60 J/g to about 250 J/g. The heat of fusion may be reduced by using additional comonomer, operating at higher polymerization temperatures, and/or using a different catalyst that provides reduced levels of steric constraints and favors more propagation errors for monomer insertion.

In one or more embodiments, the $C_2$-based polymer may have a percent crystallinity of from about 0.3% to about 40%, from about 0.5% to about 30%, or from about 1% to about 25%, or from about 5% to about 20%. Percent crystallinity may be determined by dividing the heat of fusion of a sample by the heat of fusion of a 100% crystalline polymer, which is 293 J/g (joules/gram) for polyethylene according to Wunderlich, B. Macromolecular Physics, Volume 1, p. 388, Academic Press, 1973.

In one or more embodiments, the $C_2$-based polymer may have a density of from about 0.85 g/cm$^3$ to about 0.92 g/cm$^3$, or from about 0.87 g/cm$^3$ to about 0.90 g/cm$^3$, or from about 0.88 g/cm$^3$ to about 0.89 g/cm$^3$ at 23° C. as measured per the ASTM D-792 test method.

In one or more embodiments, the $C_2$-based polymer may have a melt flow rate (MFR), as measured according to the ASTM D-1238, 2.16 kg weight at 230° C., greater than or equal to about 0.3 dg/min, or at least about 0.5 dg/min, or at least about 0.8 dg/min, or at least about 1.0 dg/min. In these or other embodiments, the melt flow rate may be equal to or less than about 7000 dg/min, or less than about 6000 dg/min, or less than about 5000 dg/min, or less than about 4000 dg/min, or less than about 3000 dg/min, or less than about 2000 dg/min, or less than about 1000 dg/min, or less than about 900 dg/min, or less than about 700 dg/min, or less than about 500 dg/min, or less than about 350 dg/min, or less than about 250 dg/min, or less than about 100 dg/min.

In one or more embodiments, the $C_2$-based polymer may have a melt flow rate (MFR), as measured according to the ASTM D-1238, 2.16 kg weight at 230° C., greater than or equal to about 250 dg/min, greater than or equal to about 500 dg/min, or greater than or equal to about 1,000 dg/min, or greater than or equal to about 1,500 dg/min, greater than or equal to about 2,000 dg/min, or greater than or equal to about 2,500 dg/min, or greater than or equal to about 3,000 dg/min, or greater than or equal to about 4,000 dg/min, or greater than or equal to about 5,000 dg/min, or greater than or equal to about 6,000 dg/min, or greater than or equal to about 7,000 dg/min.

In one or more embodiments, the $C_2$-based polymer can have a weight average molecular weight ($M_W$) of about 50,000 g/mole or less, for example, from about 5,000 to about 50,000 g/mole, or from about 5,000 to about 40,000 g/mole, or from about 5,000 to about 30,000 g/mole, or from about 10,000 to about 30,000 g/mole, or from about 20,000 to about 30,000 g/mole.

In one or more embodiments, the $C_2$-based polymer can have a number average molecular weight ($M_n$) of from about 2,500 to about 25,000 g/mole, or from about 2,500 to about 20,000 g/mole, or from about 2,500 to about 15,000 g/mole.

In one or more embodiments, the molecular weight distribution (MWD), the ratio of the weight-average molecular weight ($M_W$) to a number-average molecular weight ($M_n$), of the $C_2$-based polymer ($M_W/M_n$), may be from about 1 to about 20, or from about 1 to about 10, or from about 1.8 to about 6, or from about 1.8 to about 5. Preferably, the ratio of a weight-average molecular weight ($M_W$) to a number-average molecular weight ($M_n$) in the range from 1 to 10, or 1 to 8, or 1 to 6, or 1 to 4.

In another embodiment, the $C_2$-based polymers described above also have a viscosity (also referred to a Brookfield viscosity or melt viscosity) of at least 250 mPa·sec at 190° C. (as measured by ASTM D-3236). Such viscosity may be about 250 mPa·sec up to 50,000 mPa·sec, or 250 mPa·sec up to 25,000 mPa·sec, or 250 mPa·sec up to 20,000 mPa·sec, or 250 mPa·sec up to 15,000 mPa·sec, or 250 mPa·sec up to 10,000 mPa·sec, or 250 mPa·sec up to 5,000 mPa·sec, or 500 mPa·sec up to 15,000 mPa·sec, or 1,000 mPa·sec up to 15,000 mPa·sec, or 1,500 mPa·sec up to 15,000 mPa·sec, or 2,000 mPa·sec up to 15,000 mPa·sec, or 3,000 mPa·sec up to 15,000 mPa·sec, or 4,000 mPa·sec up to 15,000 mPa·sec, or 5,000 mPa·sec up to 15,000 mPa·sec, or 2,500 mPa·sec up to 12,500 mPa·sec, or up to 3,000 mPa·sec up to 12,000 mPa·sec, or 3,500 mPa·sec up to 11,000 mPa·sec, or 4,000 mPa·sec up to 10,000 mPa·sec, or 5,000 mPa·sec up to 10,000 mPa·sec, or 500 mPa·sec up to 10,000 mPa·sec, or 500 mPa·sec up to 9,000 mPa·sec, or 500 mPa·sec up to 8,000 mPa·sec, or 500 mPa·sec up to 7,000 mPa·sec, or 500 mPa·sec up to 6,000 mPa·sec, or 500 mPa·sec up to 5,000 mPa·sec, or 500 mPa·sec up to 4,000 mPa·sec, or 500 mPa·sec up to 3,000 mPa·sec, as measured by ASTM D-3236 at 190° C.

In another embodiment, the $C_2$-based polymers described above also have a viscosity (also referred to a Brookfield viscosity or melt viscosity) of greater than 250 mPa·sec at 190° C., or greater than 500 mPa·sec, or greater than 1,000 mPa·sec, or greater than 2,000 mPa·sec, or greater than 3,000 mPa·sec, or greater than 4,000 mPa·sec, or greater than 5,000 mPa·sec, as measured by ASTM D-3236 at 190° C.

In another embodiment, the $C_2$-based polymer has a characteristic time ($t_c$), as defined by Equation 1 above, of at least 0.1 nanoseconds (ns), or at least 1 nanosecond, or at least 50 nanoseconds, or at least 100 nanoseconds, or at least 500 nanoseconds, or at least 1000 nanoseconds. In one or more embodiments, the characteristic time ($t_c$) of the $C_2$-based polymer is from 1 to 1500 nanoseconds, or from 1 to 1200 nanoseconds, or from 1 to 1000 nanoseconds, or from 1 to 800 nanoseconds, or from 1 to 600 nanoseconds, or from 1 to 500 nanoseconds, or from 1 to 200 nanoseconds, or from 1 to 100 nanoseconds. In one or more embodiments, the characteristic time ($t_c$) of the $C_2$-based polymer is in the range of from 100 to 1000 nanoseconds, or from 125 to 950 nanoseconds, or from 150 to 900 nanoseconds, or from 200 to 800 nanoseconds.

In one or more embodiments, the adhesive compositions described herein may comprise from about 50 wt. % to about 99 wt. %, or from about 60 wt. % to about 99 wt. %, or from about 70 wt. % to about 99 wt. %, or from about 80 wt. % to about 99 wt. % of the $C_2$-based polymer component.

Propylene-Based Polymer Component

In one or more embodiments of the present invention, the adhesive compositions described herein comprise a propylene-based polymer component, which in turn may comprise one or more propylene-based polymer(s). In one embodiment, the propylene-based polymer component comprises more than 50 wt. % propylene-derived units and 1 wt. % to 49 wt. % of units derived from at least one second comonomer-derived unit. The second comonomer is an alpha-olefin, and is preferably ethylene. The second comonomer is selected from the group consisting of ethylene, a $C_4$ to $C_{20}$ alpha-olefin, and combinations thereof. In some embodiments, the propylene-based polymer component is a random copolymer and in other embodiments the propylene-based polymer component is an elastomeric random copolymer. In some embodiments, the propylene-based polymers comprise units derived from propylene and from about 1 to about 49 wt. %, or from about 5 to about 40 wt. % units derived from $C_4$ to $C_{10}$ alpha-olefin. In another embodiment, the second comonomer may comprise at least one $C_4$ to $C_8$ alpha-olefin. In one or more embodiments, the second comonomer units may derive from ethylene, 1-butene, 1-hexene, 4-methyl-1-pentene, 1-octene, and/or 1-decene, preferably, 1-hexene or 1-octene. The embodiments described below are discussed with reference to ethylene as the second comonomer, but the embodiments are equally applicable to other polymers with other alpha-olefin comonomers. In this regard, the polymer may simply be referred to as propylene-based polymers with reference to ethylene as the comonomer.

In one or more embodiments, the propylene-based polymers comprise at least about 1 wt. %, at least about 2 wt. %, at least about 3 wt. %, at least about 5 wt. %, at least about 6 wt. %, at least about 8 wt. %, or at least about 10 wt. % of at least one second comonomer selected from the group consisting of ethylene, $C_4$ to $C_{20}$ alpha-olefins, and combinations thereof. Preferably, the propylene-based polymer comprises 51 wt. % to 99 wt. % of propylene-derived units and 49 wt. % to 1 wt. % of ethylene-derived units, based on the weight of the propylene-based polymer. In those or other embodiments, the propylene-based polymers may include up to about 49 wt. %, or up to about 39 wt. %, or up to about 29 wt. %, or up to about 19 wt. %, or up to about 15 wt. %, or up to about 10 wt. %, or up to about 8 wt. %, or up to about 5 wt. %, or up to about 1 wt. % of at least one second comonomer selected from the group consisting of ethylene, $C_4$ to $C_{20}$ alpha-olefin, and combinations thereof, where the percentage by weight is based upon the total weight of the propylene-derived and alpha-olefin derived units. Stated another way, the propylene-based polymers may include at least about 51 wt. %, or at least about 60 wt. %, or at least about 70 wt. %, or at least about 75 wt. %, or at least about 80 wt. %, or at least about 82 wt. %, or at least about 84 wt. %, or at least about 86 wt. %, or at least about 88 wt. %, or at least about 90 wt. % of propylene-derived units; and in these or other embodiments, the propylene-based polymers may include up to about 99 wt. %, or up to about 98 wt. %, or up to about 97 wt. %, or up to about 95 wt. %, or up to about 94 wt. %, or up to about 92 wt. %, or up to about 90 wt. % of propylene-derived units, where the percentage by weight is based upon the total weight of the propylene-derived and ethylene-derived units.

The propylene-based polymers of one or more embodiments are characterized by having a single melting temperature as determined by differential scanning calorimetry (DSC). The melting point is defined as the temperature of the greatest heat absorption within the range of melting of the sample. The propylene-based polymer may show secondary melting peaks adjacent to the principal peak, but for purposes herein, these secondary melting peaks are considered together as a single melting point, with the highest of these peaks being considered the melting point ($T_m$) of the propylene-based polymer.

In one or more embodiments, the $T_m$ of the propylene-based polymers (as determined by DSC) is less than about 130° C., or less than about 120° C., or less than about 115° C., or less than about 110° C., or less than about 100° C.

In one or more embodiments, the propylene-based polymers may be characterized by a heat of fusion ($H_f$), as determined by differential calorimetry according to ASTM D-3418-03. In one or more embodiments, the heat of fusion of the propylene-based polymer is at least about 45 J/g, or at least about 50 J/g, or at least about 55 J/g, or at least about 60 J/g, or at least about 75 J/g. In one or more embodiments, the heat of fusion is in the range from any lower limit of about 45 J/g, or 50 J/g, or 55 J/g, or 60 J/g, or 75 J/g, up to any upper limit of about 150 J/g, or 140 J/g, or 130 J/g, or 120 J/g, or 100 J/g, or 90 J/g, or 85 J/g, or 80 J/g, or 75 J/g, or 70 J/g, or 65 J/g, or 60 J/g. Preferably, the heat of fusion of the propylene-based polymer is from about 45 to about 150 J/g, or about 55 to about 140 J/g, or about 65 to about 130 J/g, or about 75 to about 120 J/g, or about 80 J/g to about 110. More preferably, the heat of fusion of the propylene-based polymer is from about 45 to about 75 J/g. The heat of fusion may be reduced by using additional comonomer, operating at higher polymerization temperatures, and/or using a different catalyst that provides reduced levels of steric constraints and favors more propagation errors for propylene insertion.

The propylene-based polymer can have a triad tacticity of three propylene units, as measured by $^{13}C$ NMR, of 75% or greater, 80% or greater, 82% or greater, 85% or greater, or 90% or greater. In one or more embodiments, ranges include from about 50% to about 99%; in other embodiments, from about 60% to about 99%; in other embodiments, from about 75% to about 99%; in other embodiments, from about 80% to about 99%; and in other embodiments, from about 60% to about 97%. Triad tacticity is determined by the methods described in U.S. Patent Application Publication No. 2004/0236042. If the triad tacticity of the copolymer is too high, the level of stereo-irregular disruption of the chain is too low and the material may not be sufficiently flexible for its purpose in a coating or tie layer. If the triad tacticity is too low, the bonding strength may be too low.

In one or more embodiments, the propylene-based polymer may have a percent crystallinity of from about 22% to about 60%, from about 22% to about 50%, or from about 25% to about 40%. Percent crystallinity may be determined by dividing the heat of fusion of a sample by the heat of fusion of a 100% crystalline polymer, which is 207 joules/gram for isotactic polypropylene according to Bu, H.-S.; Cheng, S. Z. D.; Wunderlich, B., Makromol. Chem. Rapid Commun., 1988, 9, p. 75.

In one or more embodiments, the propylene-based polymer may have a density of from about 0.85 g/cm$^3$ to about 0.92 g/cm$^3$, or from about 0.87 g/cm$^3$ to about 0.90 g/cm$^3$, or from about 0.88 g/cm$^3$ to about 0.89 g/cm$^3$ at 23° C. as measured per the ASTM D-792 test method.

In one or more embodiments, the propylene-based polymer may have a melt flow rate (MFR), as measured according to the ASTM D-1238, 2.16 kg weight at 230° C., greater than or equal to about 250 dg/min, greater than or equal to about 500 dg/min, or greater than or equal to about 1,000 dg/min, or greater than or equal to about 1,500 dg/min, or greater than or equal to about 2,000 dg/min, or greater than or equal to about 2,500 dg/min, or greater than or equal to about 3,000 dg/min, or greater than or equal to about 4,000 dg/min, or greater than or equal to about 5,000 dg/min, or greater than or equal to about 6,000 dg/min, or greater than or equal to about 7,000 dg/min.

In one or more embodiments, the propylene-based polymer can have a weight average molecular weight ($M_w$) of about 50,000 g/mole or less, for example, from about 5,000 to about 50,000 g/mole, or from about 5,000 to about 40,000 g/mole, or from about 5,000 to about 30,000 g/mole, or from about 10,000 to about 30,000 g/mole, or from about 20,000 to about 30,000 g/mole.

In one or more embodiments, the propylene-based polymer can have a number average molecular weight ($M_n$) of from about 2,500 to about 25,000 g/mole, or from about 2,500 to about 20,000 g/mole, or from about 2,500 to about 15,000 g/mole.

In one or more embodiments, the molecular weight distribution (MWD), the ratio of the weight-average molecular weight ($M_W$) to a number-average molecular weight ($M_n$), of the propylene-based polymer ($M_W/M_n$), may be from about 1 to about 20, or from about 1 to about 10, or from about 2 to about 5, or from about 1 to about 3. Preferably, the ratio of a weight-average molecular weight ($M_W$) to a number-average molecular weight ($M_n$) in the range from 1 to 10, or 1 to 8, or 1 to 6, or 1 to 4.

In another embodiment, the propylene-based polymers described above also have a viscosity (also referred to a Brookfield viscosity or melt viscosity) in the range from 100 to 1500 mPa·sec at 190° C. (as measured by ASTM D-3236). Such viscosity may be in the range from 125 mPa·sec to 1400 mPa·sec, or 150 mPa·sec to 1300 mPa·sec, or 175 mPa·sec to 1200 mPa·sec, or 200 mPa·sec to 1100 mPa·sec, or 225 mPa·sec to 1000 mPa·sec, or 250 mPa·sec to 900 mPa·sec, or 300 mPa·sec to 800 mPa·sec, or 400 mPa·sec to 600 mPa·sec, as measured by ASTM D-3236 at 190° C.

In another embodiment, the propylene-based polymer has a characteristic time ($t_c$), as defined by Equation 1 above, of at least 0.1 nanoseconds, or at least 0.5 nanoseconds, or at least 1 nanosecond, or at least 3 nanoseconds. In one or more embodiments, the characteristic time ($t_c$) of the propylene-based polymer is from 0.05 to 100 nanoseconds, or from 0.1 to 100 nanoseconds, or from 0.1 to 75 nanoseconds, or from 0.1 to 50 nanoseconds, or from 0.1 to 25 nanoseconds, or from 0.1 to 20 nanoseconds, or from 0.1 to 15 nanoseconds, or from 0.1 to 10 nanoseconds. In one or more embodiments, the characteristic time ($t_c$) of the propylene-based polymer is in the range of from 1 to 100 nanoseconds, or from 1 to 75 nanoseconds, or from 1 to 50 nanoseconds, or from 1 to 25 nanoseconds.

In one or more embodiments, the adhesive compositions described herein may comprise from about 1 wt. % to about 99 wt. %, or from about 5 wt. % to about 90 wt. %, or from about 5 wt. % to about 80 wt. %, or from about 10 wt. % to about 60 wt. % of the propylene-based polymer component.

Adhesive Compositions of the Ethylene-Based and Propylene-Based Polymers

In one or more embodiments of the adhesive composition of this invention, the ratio of the characteristic time ($t_c$) of said ethylene-based polymer to said characteristic time ($t_c$) of said propylene-based polymer is from 1 to 1000, or 1 to 800, or 1 to 600, or 1 to 400, or 1 to 200.

In one or more embodiments of this invention, the second comonomer of the propylene-based polymer and the second comonomer of the ethylene-based polymer are different. Preferably, the second comonomer is ethylene and the second comonomer is octene.

In one or more embodiments of this invention, the adhesive composition has a Brookfield viscosity measured by ASTM D-3236 at 177° C. is from 250 to 30,000 mPa·sec, or 1,000 to 4,500 mPa·sec, or 700 to 8,000 mPa·sec, or 900 to 6,000 mPa·sec, or 1,100 to 4,000 mPa·sec, or 1,300 to 3,000 mPa·sec, or 1,500 to 2,000 mPa·sec.

In one or more embodiments of this invention, the adhesive composition has a melting temperature measured by differential scanning calorimetry at second melt with a heating rate of 10° C./min is no more than 130° C., or no more than 125° C., or no more than 120° C., or no more than 115° C.

In one or more embodiments, the adhesive composition of this invention comprises: (a) an ethylene-based polymer comprising more than 50 wt. % of ethylene-derived units and in the range of 1 wt. % to 49 wt. % of units derived from octene, said ethylene-based polymer having a Brookfield viscosity in the range of 250 to 50,000 mPa·sec measured by ASTM D-3236 at 190° C., a heat of fusion in the range of 60 to 250 J/g measured by ASTM D-3418-03, wherein the weight percent measurements are based on the weight of the ethylene-based polymer, and a characteristic time ($t_c$) in the range of 1 to 1,000 nanoseconds; (b) a propylene-based polymer comprising more than 50 wt. % propylene-derived units and in the range of 1 wt. % to 49 wt. % of units derived from ethylene, said propylene-based polymer having a Brookfield viscosity in the range from 100 mPa·sec to 1,500 mPa·sec measured by ASTM D-3236 at 190° C., a heat of fusion of at least 45 J/g measured by ASTM D-3418-03, and a characteristic time ($t_c$) in the range of 1 to 100 nanoseconds, wherein the weight percent measurements are based on the weight of the propylene-based polymer; wherein said characteristic time ($t_c$) in units of nanoseconds is defined by Equation 1, as set forth above.

Hot Melt Adhesive Compositions of the Ethylene-Based and Propylene-Based Polymers In one or more embodiments, the adhesive composition of this invention further comprises one or more additives to form a hot melt adhesive (HMA). The additives are selected from the group consisting of a functionalized component, a tackifier component, a process oil component, a wax component, an antioxidant component, or a mixture thereof.

In one or more embodiments of the invention, the adhesive composition has a Brookfield viscosity greater from a lower limit of from about 250 mPa·sec, or about 500 mPa·sec, or about 1,000 mPa·sec, or about 2,000 mPa·sec, or about 5,000 mPa·sec, up to an upper limit of about 10,000 mPa·sec, or about 20,000 mPa·sec, or about 30,000 mPa·sec, or about 40,000 mPa·sec, or about 50,000 mPa·sec, measured by ASTM D-3236 at 177° C.

In one or more embodiments of this invention, the hot melt adhesive composition has one or more of the following properties:
(i) a Brookfield viscosity of 250 to 10,000 mPa·sec measured by ASTM D-3236 at 177° C.;
(ii) an Average percent Fiber Tear greater than 99%, wherein Average percent Fiber Tear is defined by the following equation: Average % Fiber Tear=(% Fiber Tear at 25° C.+% Fiber Tear at 2° C.+% Fiber Tear at −18° C.)/3;
(iii) an adhesion set time less than 5 seconds;
(iv) a melting temperature ($T_m$) of 130° C. or less measured by differential scanning calorimetry at second melt with a heating rate of 10° C./min;
(v) a calculated density of said adhesive composition at 23° C. of lower than about 0.91000 g/cm³, wherein said calculated density is determined from the weight percent and the density of each component is said adhesive composition;
(vi) a heat of fusion ($H_f$) of said adhesive composition of about 19 J/g to about 45 J/g; and
(vii) a hot melt adhesive (HMA $t_c$) characteristic time of about 15 to about 100 nanoseconds, said HMA characteristic time (HMA $t_c$) defined by:

$$HMA\ t_c = \frac{BV\ at\ 177°\ C.}{Density \times Heat\ of\ Fusion}$$

wherein said BV is the Brookfield viscosity of said adhesive composition measured by ASTM D-3236 at 177° C. in units of mPa·sec, said Density is the calculated density of said adhesive composition at 23° C. in units of g/cm³, and said Heat of Fusion is the heat of fusion of said adhesive composition measured by ASTM D-3418-03 in units of J/g.

In one or more embodiments, the invention includes a hot melt adhesive composition comprising: (a) 40 wt. % to 60 wt. % of a $C_2$-based polymer, said $C_2$-based polymer having a Brookfield viscosity in the range of 250 to 50,000 mPa·sec measured by ASTM D-3236 at 190° C., a heat of fusion in the range of 20 to 250 J/g measured by ASTM D-3418-03, wherein the weight percent measurements are based on the weight of the ethylene-based polymer, and a characteristic time ($t_c$) in the range of 1 to 1000 nanoseconds; (b) 40 wt. % to 60 wt. % of a propylene-based polymer, said propylene-based polymer having a Brookfield viscosity in the range from 100 mPa·sec to 1500 mPa·sec measured by ASTM D-3236 at 190° C., a heat of fusion in the range of 45 to 75 J/g measured by ASTM D-3418-03, and a characteristic time ($t_c$) in the range of 1 to 100 nanoseconds, wherein the weight percent measurements are based on the weight of the propylene-based polymer; and (c) at least one of a functionalized component, a tackier component, a process oil component, a wax component, an antioxidant component, or a mixture thereof, and wherein said characteristic time ($t_c$) in units of nanoseconds is defined by Equation 1, as set forth above.

Functionalized Component

By "functionalized component" it is meant that the component (e.g., polymer) is contacted with a functional group, and, optionally, a catalyst, heat, initiator, or free radical source to cause all or part of the functional group to incorporate, graft, bond to, physically attach to, and/or chemically attach to the polymer.

The adhesive composition may comprise one or more additives including functional components. In this section we discuss these functional components in further detail. Typically, the component to be functionalized is combined with a free radical initiator and a grafting monomer or other functional group (such as maleic acid or maleic anhydride) and is heated to react the monomer with the polymer, copolymer, oligomer, etc., to form the functionalized component. Multiple methods exist in the art for functionalizing polymers that may be used with the polymers described here. These include selective oxidation, free radical grafting, ozonolysis, epoxidation, and the like.

Examples of suitable functionalized components for use in this invention include, but are not limited to, functionalized olefin polymers, (such as functionalized $C_2$ to $C_{40}$ homopolymers, functionalized $C_2$ to $C_{40}$ copolymers, functionalized higher $M_W$ waxes), functionalized oligomers, (such as functionalized low $M_W$ waxes, functionalized tackifiers), beta nucleating agents, and combinations thereof.

Functionalized olefin polymers and copolymers useful in this invention include maleated polyethylene, maleated metallocene polyethylene, maleated metallocene polypropylene, maleated ethylene propylene rubber, maleated polypropylene, maleated ethylene copolymers, functionalized polyisobutylene (typically functionalized with maleic anhydride to form a succinic anhydride), and the like.

Preferred functionalized waxes useful as functionalized components herein include those modified with an alcohol, an acid, a ketone, an anhydride, and the like.

Preferred examples include waxes modified by methyl ketone, maleic anhydride or maleic acid. Preferred functionalized waxes useful herein include maleated polypropylene (which was available from Chusei under the tradename MAPP 40); maleated metallocene waxes (such as TP LICOCENE PP 1602 available from Clariant in Augsburg, Germany); maleated polyethylene waxes and maleated polypropylene waxes (available from Eastman Chemical in Kingsport, Tenn. under the tradenames EPOLENE C-16, EPOLENE C-18, EPOLENE E43, and EPOLENE G-3003); maleated polypropylene wax LICOMONT AR 504 (available from Clariant); grafted functional polymers (available from Dow Chemical Co. under the tradenames AMPLIFY EA 100, AMPLIFY EA 102, AMPLIFY 103, AMPLIFY GR 202, AMPLIFY GR 205, AMPLIFYGR 207, AMPLIFY GR 208, AMPLIFY GR 209, and AMPLIFY VA 200); maleated ethylene polymers (available from Baker Hughes under the tradenames CERAMER 1608, CERAMER 1251, CERAMER 67, and CERAMER 24); and ethylene methyl acrylate co and terpolymers.

Useful waxes include polypropylene waxes having an $M_W$ of 15,000 of less, preferably from 3,000 to 10,000 and a crystallinity of 5 wt. % or more, preferably 10 wt. % or more, having a functional group content (preferably maleic anhydride) of up to 10 wt. %.

Additional preferred functionalized polymers for use as functional components herein include A-C X596A, A-C X596P, A-C X597A, A-C X597P, A-C X950P, A-C X1221, A-C 395A, A-C 395A, A-C 1302P, A-C 540, A-C 54A, A-C 629, A-C 629A, A-C 307, and A-C 307A available from Honeywell.

UNILIN long chain alcohols, available from Baker Hughes, are also useful as functionalized components herein, particularly UNILIN 350, UNILIN 425, UNILIN 550, and UNILIN 700.

UNICID linear, primary carboxylic acids, available from Baker Hughes, are also useful as functionalized components herein, particularly UNICID 350, UNICID 425, UNICID 550, and UNICID 700.

Preferred functionalized hydrocarbon resins that may be used as functionalized components in this invention include those described in PCT Publication Nos. WO 03/025084; WO 03/025037; WO 03/025036; and European Publication No. EP 1 295 926 A1; which are incorporated by reference herein.

In a preferred embodiment, a hydrocarbon resin is functionalized with unsaturated acids or anhydrides containing at least one double bond and at least one carbonyl group and used as the functionalized component of this invention. Preferred hydrocarbon resins that can be functionalized are listed below as tackifiers. Representative acids include carboxylic acids, anhydrides, esters and their salts, both metallic and non-metallic. Preferably, the organic compound contains an ethylenic unsaturation conjugated with a carbonyl group (—C=O). Examples include maleic, fumaric, acrylic, methacrylic, itaconic, crotonic, alpha-methyl crotonic, and cinnamic acids as well as their anhydrides, esters and salt derivatives. Particularly preferred functional groups include maleic acid and maleic anhydride. Maleic anhydride is particularly preferred. The unsaturated acid or anhydride is preferably present at about 0.1 wt. % to about 10 wt. %, preferably at about 0.5 wt. % to about 7 wt. %, even more preferably at about 1 wt. % to about 4 wt. %, based upon the weight of the hydrocarbon resin and the unsaturated acid or anhydride. In a preferred embodiment, the unsaturated acid or anhydride comprises a carboxylic acid or a derivative thereof selected from the group consisting of unsaturated carboxylic acids, unsaturated carboxylic acid derivatives selected from esters, imides, amides, anhydrides and cyclic acid anhydrides, or mixtures thereof In a preferred embodiment the functionalized component is present at between 0.005 wt. % to 99 wt. %, preferably between 0.01 wt. % to 99 wt. %, preferably between 0.05 wt. % to 90 wt. %, preferably between 0.1 wt. % and 75 wt. %, more preferably between 0.5 wt. % and 60 wt. %, more preferably between 1 wt. % and 50 wt. %, more preferably between 1.5 wt. % and 40 wt. %, more preferably between 2 wt. % and 30 wt. %, more preferably between 2 wt. % and 20 wt. %, more preferably between 2 wt. % and 15 wt. %, more preferably between 2 wt. % and 10 wt. %, more preferably between 2 wt. % and 5 wt. %, based upon the weight of the blend. Preferably, the functionalized component is present at 0.005 wt. % to 10 wt. %, more preferably 0.01 wt. % to 10 wt. %, based upon the weight of the blend.

In other embodiments, the functionalized component is present at from 0.01 wt. % to 5 wt. %, preferably from 0.01 wt. % to 4 wt. %, preferably from 0.01 wt. % to 3 wt. %, preferably from 0.01 wt. % to 2 wt. %, preferably from 0.01 wt. % to 1 wt. %, preferably from 0.01 wt. % to 0.5 wt. % or less, preferably from 0.01 wt. % to 0.1 wt. %, based upon the weight of the adhesive composition. In some preferred embodiments, the functionalized component is present in an amount from 1 wt. % to 5 wt. %, from 1 wt. % to 4 wt. %, or from 2.0 wt. % to 4.0 wt. %. In some preferred embodiments, a functionalized component is not present in the adhesive.

Tackifier Resin Component

In one or more embodiments of the present invention, the adhesive compositions described herein comprise a tackifier resin component, which may in turn comprise one or more hydrocarbon tackifier resins described herein.

In general, the tackifier resin component includes amorphous materials that can be added to an adhesive composition to achieve modification of adhesive characteristics. The tackifier resin component can be a low molecular weight natural or synthetic resin which is compatible with the polyolefins) and which provide the desired enhancement of film properties. Natural resins are defined as resins of plant or animal origin which include, but are not limited to, rosins such as gum, wood, or tall oil rosins. Synthetic resins are defined as resins resulting from controlled chemical reactions, such as hydrocarbon resins. Examples of hydrocarbon resins include coal tar resins, petroleum resins, and turpentine resins.

Examples of suitable tackifier resin components, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, phenolic resins, hydrogenated terpenes, modified terpenes, hydrogenated rosin acids, and hydrogenated rosin esters. In some embodiments, the tackifier is hydrogenated.

In other embodiments, the tackifier is non-polar, by which is meant that the tackifier is substantially free of monomers having polar groups. Preferably, the polar groups are not present; however, if present, they comprise not more than 5 wt. %, preferably not more than 2 wt. %, even more preferably no more than 0.5 wt. %, of the tackifier. In some embodiments, the tackifier has a softening point (Ring and Ball, as measured by ASTM E-28) of 80° C. to 150° C., preferably 100° C. to 130° C. In another embodiment, the resin is liquid and has an R and B softening point of between 10° C. and 70° C.

The tackifier, if present, is typically present in an amount of at least about 1 wt. %, at least about 10 wt. %, at least about 20 wt. %, at least about 30 wt. %, at least about 40 wt. %, at least about 50 wt. %, at least about 60 wt. %, at least about 70 wt. %.

Preferred hydrocarbon tackifier resins for use as tackifiers or modifiers include:

(a) Resins such as $C_5/C_6$ terpene resins, styrene terpenes, alpha-methyl styrene terpene resins, $C_9$ terpene resins, aromatic modified $C_5/C_6$, aromatic modified cyclic resins, aromatic modified dicyclopentadiene based resins, or mixtures thereof. Additional preferred resins include those described in PCT Publication No. WO 91/07472; and U.S. Pat. Nos. 5,571,867; 5,171,793; and 4,078,132. Typically, these resins are obtained from the cationic polymerization of compositions containing one or more of the following monomers: $C_5$ diolefins (such as 1-3 pentadiene, isoprene, etc.); $C_5$ olefins (such as 2-methylbutenes, cyclopentene, etc.); $C_6$ olefins (such as hexene); $C_9$ vinylaromatics (such as styrene, alpha methyl styrene, vinyltoluene, indene, methyl indene, etc.); cyclics (such as dicyclopentadiene, methyldicyclopentadiene, etc.); and/or terpenes (such as limonene, carene, etc.); and (b) Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene).

In one embodiment, the tackifier resin component may comprise one or more hydrocarbon resins produced by the thermal polymerization of cyclopentadiene (CPD) or substituted CPD, which may further include aliphatic or aromatic monomers as described later. The hydrocarbon resin may be a non-aromatic resin or an aromatic resin. The hydrocarbon resin may have an aromatic content between 0% and 60%, preferably between 1% and 60%, or between 1% and 40%, or between 1% and 20%, or between 10% and 20%. In further embodiments, the hydrocarbon resin may have an aromatic content between 15% and 20%, or between 1% and 10%, or between 5% and 10%.

In another embodiment, the tackifier resin component may comprise hydrocarbon resins produced by the catalytic (cationic) polymerization of linear dienes. Such monomers are primarily derived from Steam Cracked Naphtha (SCN) and include $C_5$ dienes such as piperylene (also known as 1,3-pentadiene). Polymerizable aromatic monomers can also be used to produce resins and may be relatively pure, e.g., styrene, methyl styrene, or from a $C_9$-aromatic SCN stream. Such aromatic monomers can be used alone or in combination with the linear dienes previously described. "Natural" monomers can also be used to produce resins, e.g., terpenes such as α-pinene or β-carene, either used alone or in high or low concentrations with other polymerizable monomers. Typical catalysts used to make these resins are $AlCl_3$ and $BF_3$, either alone or complexed. Mono-olefin modifiers such as 2-methyl-2-butene may also be used to control the molecular weight distribution (MWD) of the final resin. The final resin may be partially or totally hydrogenated as described in further detail below.

As used herein, aromatic content and olefin content are measured by $^1$H-NMR, as measured directly from the $^1$H-NMR spectrum from a spectrometer with a field strength greater than 300 MHz, preferably 400 MHz. Aromatic content is the integration of aromatic protons versus the total number of protons. Olefin proton or olefinic proton content is the integration of olefinic protons versus the total number of protons.

In one or more embodiments, the tackifier resin component may be at least partially hydrogenated or substantially hydrogenated. As used herein, "at least partially hydrogenated" means that the material contains less than 90% olefinic protons, or less than 75% olefinic protons, or less than 50% olefinic protons, or less than 40% olefinic protons, or less than 25% olefinic protons. As used herein, "substantially hydrogenated" means that the material contains less than 5% olefinic protons, or less than 4% olefinic protons, or less than 3% olefinic protons, or less than 2% olefinic protons. The degree of hydrogenation is typically conducted so as to minimize and preferably avoid hydrogenation of the aromatic bonds.

In one or more embodiments, tackifier resin components described herein may be uniquely characterized as totally or substantially amorphous in nature. This means that a glass transition temperature ($T_g$) is detectable, e.g., by Differential Scanning calorimetry (DSC) but they have no melting point ($T_m$). To characterize these resins, it is generally accepted to use a test that roughly correlates with $T_g$, such as softening point (SP), which provides approximate, but not exact, values. The softening point (SP) of the resins is measured by a ring-and-ball softening point test according to ASTM E-28.

In some embodiments, the tackifiers may have a softening point of from about 50° C. to about 140° C., or from about 60° C. to about 130° C., or from about 70° C. to about 120° C., or from about 80° C. to about 110° C.

Typically, in one or more embodiments of the invention, the tackifier resin component has a number average molecular weight ($M_n$) from about 400 to about 3000, a weight average molecular weight ($M_W$) from about 500 to about 6000, a z-average molecular weight ($M_Z$) from about 700 to about 15,000, and a polydispersity (PD), defined as $M_W/M_n$, between about 1.5 and about 4. As used herein, molecular weights (number average molecular weight ($M_n$), weight average molecular weight ($M_W$), and z-average molecular weight ($M_Z$) are measured by size exclusion chromatography using a Waters 150 Gel Permeation Chromatograph equipped with a differential refractive index detector and calibrated using polystyrene standards. Samples are run in tetrahydrofuran (THF) (45° C.). Molecular weights are reported as polystyrene-equivalent molecular weights and are generally measured in g/mole.

In one or more embodiments of the invention, the tackifier resin component may comprise one or more oligomers such as dimers, trimers, tetramers, pentamers, and hexamers. The oligomers may be derived from a petroleum distillate boiling in the range of 30° C. to 210° C. The oligomers may be derived from any suitable process and are often derived as a byproduct of resin polymerization. Suitable oligomer streams may have molecular weights ($M_n$) between 130 and 500 g/mole, more preferably between 130 to 410 g/mole, more preferably between 130 and 350 g/mole, or between 130 and 270 g/mole, or between 200 and 350 g/mole, or between 200 and 320 g/mole. Examples of suitable oligomer streams include, but are not limited to, oligomers of cyclopentadiene and substituted cyclopentadiene, oligomers of $C_4$ to $C_6$ conjugated diolefins, oligomers of $C_8$ to $C_{10}$ aromatic olefins, and combinations thereof. Other monomers may be present. These include $C_4$ to $C_6$ mono-olefins and terpenes. The oligomers may comprise one or more aromatic monomers and may be at least partially hydrogenated or substantially hydrogenated.

In one embodiment, the oligomers may be stripped from the resin before hydrogenation. The oligomers may also be hydrogenated with the resin and then stripped from the resin, yielding a hydrogenated resin and hydrogenated oligomers. In another embodiment, at least some of the oligomers are stripped before hydrogenation and at least some hydrogenated oligomers are stripped after hydrogenation. In yet another embodiment, the hydrogenated resin/oligomers product may be further processed together as a single mixture as described below. In yet another embodiment, the oligomers can be derived from any suitable source and hydrogenated (if necessary) before grafting so that the oligomers before grafting are typically at least partially hydrogenated and preferably substantially hydrogenated.

Examples of commercially available tackifiers include, but are not limited to, Escorez 2203, Escorez 1310LC, Escorez 1304, Escorez 5380, Escorez 5400, and Escorez 5600, manufactured by ExxonMobil Chemical Company; Piccotac 1905 and Eastotac H-100, manufactured by Eastman Chemicals; Quintone D and Quintone U 185, manufactured by Nippon Zeon; Marukares R100, manufactured by Maruzen; and Wingtack Extra and Wingtack Plus, manufactured by Cray Valley. Escorez 2101, Escorez 5690, and Escorez 2173, manufactured by ExxonMobil Chemical Company; Regalrez 5095, Regalrez 3102, Staybelite Ester 3, and Pentalyn H, manufactured by Eastman Chemicals; Quintone U 190, manufactured by Nippon Zeon; Wingtack 86, manufactured by Cray Valley; and Sylvalite RE 885 and Sylvatac RE 85, available from Arizona Chemical.

In one or more embodiments, the adhesive compositions described herein may comprise from about 5 wt. % to about 50 wt. %, or from about 10 wt. % to about 40 wt. %, or from about 15 wt. % to about 35 wt. % of the tackifier resin component.

Process Oil Component

In one or more embodiments of the present invention, one or more process oils may be added to the adhesive compositions described herein. As used herein, the term "process oil" means both petroleum derived process oils and synthetic plasticizers.

Examples of process oils suitable for use in the present invention include, but are not limited to, paraffinic or naphthenic oils such as Primol 352 or Sentinel PO 876, produced by ExxonMobil Chemical France; and Nyflex 222B, available from Nynas AB.

Further process oils suitable for use in the present invention include aliphatic naphthenic oils, white oils, and the like. Exemplary plasticizers and/or adjuvants include mineral oils, polybutenes, phthalates, and the like. In one or more embodiments, the plasticizers may include phthalates, such as di-iso-undecyl phthalate (DIUP), di-iso-nonylphthalate (DINP), dioctylphthalates (DOP), and polybutenes, such as Parapol 950 and Parapol 1300 available from ExxonMobil Chemical Company in Houston, Tex. Further useful plasticizers include those described in PCT Publication No. WO 01/18109A1 and U.S. Application Publication No. 2004/0106723, which are incorporated by reference herein.

In one or more embodiments, the adhesive compositions described herein may comprise from about 1 wt. % to about 50 wt. %, or from about 5 wt. % to about 40 wt. %, or from about 10 wt. % to about 35 wt. %, or from about 15 wt. % to about 30 wt. % of the optional process oil component.

Wax Component

In one or more embodiments of the present invention, one or more waxes may be added to the adhesive compositions described herein. Non-limiting examples of waxes, which can be employed, include petroleum based and synthetic waxes. Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes, functionalized waxes such as hydroxy stearamide waxes and fatty amide waxes, and combinations thereof. In embodiments, the wax components may be of the same or different types of waxes, and may be miscible or immiscible. It is common in the art to use the terminology synthetic high melting point waxes to include high density low molecular weight polyethylene waxes, by-product polyethylene waxes, and Fischer-Tropsch waxes, which are useful herein.

Modified waxes, such as vinyl acetate modified, maleic anhydride modified, oxidized waxes, and other polar waxes may also be used in an embodiment as previously mentioned. In one embodiment, the functionalized wax component is a single component but serves a dual function as both the functionalized polyolefin component and one or more of the wax components. In another embodiment, the adhesive is essentially free of modified waxes, i.e., it is free of deliberately added modified waxes or contains less than 1 wt. % of modified waxes. In an embodiment, the wax component comprises less than 2 wt. % or less than 1 wt. % modified waxes by weight of the total wax components.

Preferably, the wax components are paraffin waxes, microcrystalline waxes, Fischer-Tropsch synthetic waxes, and polyethylene waxes, all of which are a blend of linear and branched hydrocarbons. Paraffin waxes are complex mixtures of many substances. They mainly consist of saturated hydrocarbons.

Microcrystalline waxes are a type of wax produced by de-waxing petrolatum, as part of the petroleum refining process. Microcrystalline wax contains a higher percentage of isoparaffinic (branched) hydrocarbons and naphthenic hydrocarbons as compared with paraffin wax. It is characterized by the fineness of its crystals in contrast to the larger crystal of paraffin wax. It consists of high molecular weight saturated aliphatic hydrocarbons, and has a high melting point. Typical microcrystalline wax crystal structure is small and thin, making the wax crystals relatively more flexible than paraffin wax crystals.

Polyolefin waxes typically have a weight average molecular weight of from 500 to 20,000 g/mole and can be produced by thermal degradation of high molecular weight branched polyolefin polymers or by direct polymerization of olefins.

In one embodiment, the adhesive composition can comprise two wax components wherein the first wax component (i.e., the low molecular weight wax component) has a weight average molecular weight (g/mole) of from 500 to 10,000, from 1,000 to 10,000, from 2,000 to 10,000, from 3,000 to 10,000, from 4,000 to 10,000, from 5,000 to 10,000, from 6,000 to 10,000, from 7,000 to 10,000, from 8,000 to 10,000, and from 9,000 to 10,000; and the second wax component (i.e., the high molecular weight wax component) has a weight average molecular weight of from 1,000 to 20,000, from 2,000 to 20,000, from 3,000 to 20,000, from 4,000 to 20,000, from 5,000 to 20,000, from 6,000 to 20,000, from 7,000 to 20,000, from 8,000 to 20,000, from 9,000 to 20,000, from 10,000 to 20,000, and from 15,000 to 20,000. Suitable polymerization processes include, for example, high-pressure technologies, in which the olefins, generally ethylene, are reacted free-radically under high pressures and temperatures to form branched waxes, and also low-pressure or Ziegler processes, in which ethylene and/or higher 1-olefins are polymerized using organometallic catalysts. Polyethylene waxes produced using metallocene catalyst have a narrower molecular weight distribution, more uniform incorporation of comonomer, and lower melting points, in comparison to the Ziegler-Natta technology. In one embodiment, the high molecular weight second wax component comprises a metallocene polyethylene wax.

In another embodiment, the molecular weight of a first wax component is sufficiently low to reduce set time, whereas a second wax component has a molecular weight sufficiently high to improve adhesion. In one embodiment, the difference between the weight average molecular weight of the first wax component ($Mw_{wax1}$) and the weight average molecular weight of the second wax component ($Mw_{wax2}$) is at least about 1000 g/mole (($Mw_{wax2}-Mw_{wax1}$)≥1000 g/mole) or at least about 2000 g/mole (($Mw_{wax2}-Mw_{wax1}$)≥2000 g/mole) or at least about 3000 g/mole (($Mw_{wax2}-Mw_{wax1}$)≥3000 g/mole) or at least about 4000 g/mole (($Mw_{wax2}-Mw_{wax1}$)≥4000 g/mole) or at least about 5000 g/mole (($Mw_{wax2}-Mw_{wax1}$)≥5000 g/mole). In an embodiment, $Mw_{wax1}$ is less than about 4000, for example, from about 450 to 4000 g/mole or from about 500 to 4000 g/mole, and $Mw_{wax2}$ is above about 5000, for example, from about 5000 to 20,000 g/mole.

In one or more embodiments, the adhesive compositions described herein may comprise from about 1 wt. % to about 50 wt. %, or from about 1 wt. % to about 40 wt. %, or from about 1 wt. % to about 30 wt. %, or from about 1 wt. % to about 20 wt. % of the optional wax component.

Other Additives and Fillers

In some embodiments, one or more additional fillers or additives may be employed to achieve the properties and characteristics desired in the final adhesive formulation. Such additive and fillers are known in the art and may include, but are not limited to, fillers, cavitating agents, antioxidants, surfactants, adjuvants, plasticizers, block, antiblock, colorants, color masterbatches, pigments, dyes, processing aids, UV stabilizers, neutralizers, lubricants, waxes, nanoclays, and/or nucleating agents. The additives may be present in any amount determined to be effective by those skilled in the art, such as, for example, from about 0.001 wt. % to about 10 wt. %.

Examples of suitable antioxidants include, but are not limited to, quinoline, e.g., trimethylhydroxyquinoline (TMQ); imidazole, e.g., zinc mercapto toluyl imidazole (ZMTI); and conventional antioxidants, such as hindered phenols, lactones, phosphates, and hindered amines. Further suitable anti-oxidants are commercially available from, for example, Ciba Geigy Corp. under the tradenames Irgafos 168, Irganox 1010, Irganox 1076, Irganox 3790, Irganox B225, Irganox 1035, Irgafos 126, Irgastab 410, and Chimassorb 944.

Fillers (regular- or nano-sized), cavitating agents, and/or nucleating agents suitable for use in the present invention may comprise granular, fibrous, and powder-like materials, and may include, but are not limited to, titanium dioxide, calcium carbonate, barium sulfate, silica, silicon dioxide, carbon black, sand, glass beads, mineral aggregates, talc, natural and synthetic clays, diatomaceous earth, and the like.

Processing aids, lubricants, waxes, and/or oils which may be employed in the adhesive compositions of the present invention include low molecular weight products such as wax, oil, or low $M_n$ polymer (low meaning having an $M_n$ less than 5,000, preferably below 4,000, or below 3,000, or below 2,500). Waxes may include polar or non-polar waxes, functionalized waxes, polypropylene waxes, polyethylene waxes, and wax modifiers.

In addition to waxes, additives also include conventional additives known in the art, including fillers, antioxidants, adjuvants, adhesion promoters, plasticizers, oils, low molecular weight polymers, block, antiblock, pigments, processing aids, UV stabilizers, neutralizers, lubricants, surfactant nucleating agents, oxidized polyolefins, acid modified polyolefins, and/or anhydride modified polyolefins.

Additives are combined with polymer compositions as individual components, in masterbatches, or combinations thereof Fillers include conventional fillers known to those skilled in the art, including titanium dioxide, calcium carbonate, barium sulfate, silica, silicon dioxide, carbon black, sand, glass beads, mineral aggregates, talc, clay, and/or nanoclay.

Antioxidants include conventional antioxidants known to those skilled in the art, including phenolic antioxidants, such as Irganox 1010 and Irganox 1076, both available from Ciba-Geigy. In some embodiments, adhesive compositions include less than about 3 wt. % anti-oxidant.

Oils include conventional oils known to those skilled in the art, including paraffinic or naphthenic oils such as Primol 352 or Primol 876 available from ExxonMobil Chemical France, S.A. in Paris, France. Preferred oils include aliphatic naphthenic oils.

Plasticizers include conventional plasticizers known to those skilled in the art, including mineral oils, phthalates, or polybutenes, such as Parapol 950 and Parapol 1300 formerly available from ExxonMobil Chemical Company in Houston, Tex. Preferred plasticizers include phthalates such as di-iso-undecyl phthalate (DIUP), di-iso-nonylphthalate (DINP), and dioctylphthalates (DOP).

Adhesion promoters include conventional adhesion promoters known to those skilled in the art. Adhesion promoters include polar acids; polyaminoamides, such as Versamid 115, 125, 140, available from Henkel; urethanes, such as isocyanate/hydroxy terminated polyester systems, e.g., bonding agent TN/Mondur Cb-75 (Miles, Inc.); coupling agents, such as silane esters (Z-6020 from Dow Corning); titanate esters, such as Kr-44 available from Kenrich; reactive acrylate monomers, such as sarbox SB-600 from Sartomer; metal acid salts, such as Saret 633 from Sartomer; and polyphenylene oxide.

Low number average molecular weight ($M_n$) polymers include conventional low $M_n$ polymers known to those skilled in the art. Preferred low $M_n$ polymers include polymers of lower alpha olefins such as propylene, butene, pentene, and hexene. A particularly preferred polymer includes polybutene having a $M_n$ of less than 1,000. An example of such a polymer is available under the tradename PARAPOL™ 950 from ExxonMobil Chemical Company. PARAPOL™ 950 is a liquid polybutene polymer having a $M_n$ of 950 and a kinematic viscosity of 220 cSt (220 mPa·sec) at 100° C., as measured by ASTM D-445. In some embodiments, polar and non-polar waxes are used together in the same composition.

Adhesive compositions are composed of less than about 30 wt. % additives based on the total weight of the adhesive composition. Preferably, adhesive compositions include less than about 25 wt. % additives, or less than about 20 wt. % additives, or less than about 15 wt. % additives, or less than about 10 wt. % additives. In some embodiments, additives are present at less than about 5 wt. %, or less than about 3 wt. %, or less than about 1 wt. %, based upon the weight of the adhesive composition.

The additives described herein can be added to the blend in pure form or in master batches.

Preparation of the Adhesive Composition

In one or more embodiments, the components of the adhesive compositions described herein may be blended by mixing, using any suitable mixing device at a temperature above the melting point of the components, e.g., at 130° C. to 180° C., for a period of time sufficient to form a homogeneous mixture, normally from about 1 to about 20 minutes depending on the type of mixing device.

In the case of continuous mixing as practiced by most commercial manufacturers, a twin screw extruder may be used to mix the adhesive components. First the ethylene-based and/or the propylene-based polymer components and additional components, such as functionalized components, are introduced into the extruder and mixed until the polymers have melted and are well mixed. Then the tackifiers are added, followed by any process oils which may be desired. To the extent pigments, antioxidants, fillers, or other additives are used, they are normally blended in with the ethylene-based and/or the propylene-based polymer components. The total mixing time is typically on the order of from about 1 to 5 minutes.

In the case of batch mixing, ethylene-based and/or the propylene-based polymer components and additional components are added along with the tackifier resin component. Once all of the tackifier resin components have been added and homogeneous mix is achieved, the balance of the process oil, antioxidants, fillers, and any other additives are added. The total mixing time may run for up to 20 minutes.

Without being bound by theory, it is believed that neither the ethylene-based polymer nor the propylene-based polymers as components of the adhesive compositions will migrate to the surface of the adhesive composition because their molecular weights are not very low and the difference in crystallinity between these components is not very large as defined by the characteristic time ($t_c$) in Equation 1. The ethylene-based polymer and the propylene-based polymer can be blended physically in any desired ratio to form the above adhesive compositions. Also, one polymer component can be prepared in one reactor and the other polymer component can be prepared in another reactor in a series reactor configuration or both copolymers can be made simultaneously in a parallel reactor configuration. The polymerizates of the two polymer components in any prescribed ratios can be subsequently mixed together and then subjected to finishing steps to form the base polymers (dual-reactor blends) of the adhesive compositions of this invention as described herein.

Applications

The adhesive compositions or HMAs described herein may be applied to any substrate. Suitable substrates may include, but are not limited to, wood, paper, cardboard, plastic, plastic film, thermoplastic, thermoplastic elastomer (TPE), thermoplastic vulcanizate (TPV), rubber, metal, metal film, metal foil (such as aluminum foil and tin foil), metallized surfaces, cloth, nonwovens (particularly polypropylene spunbonded fibers or nonwovens), spunbonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC, and the like, or combinations thereof. Additional substrates may include polyethylene, polypropylene, polyacrylates, acrylics, polyethylene terephthalate, or blends thereof. Corona treatment, electron beam irradiation, gamma irradiation, microwave or silanization may modify any of the above substrates.

The adhesive compositions of this invention may be applied to a substrate as a melt and then cooled. The adhesive composition may be applied to a substrate using conventional coating techniques such as roller coaters, die coaters, and blade coaters, generally at a temperature of from about 150° C. to about 200° C. In one or more embodiments, the adhesive composition is applied to a substrate using a slot die.

A slot die is a closed system where an adhesive composition is pumped through the system via a positive displacement pump. The slot die usually includes a rotating bar at the point of the outlet of the adhesive in order to maintain a smooth surface.

The substrate should be coated with sufficient adhesive composition to provide a dry coating weight of from about 10 to about 100, or from about 10 to about 50, or from about 15 to about 25 grams per square meter (gsm).

After coating, the coated substrate is cut to the required dimension. In the manufacture of tape, the substrate is slit into strips and rolled into a finished product. The substrate may also be cut into shaped items to provide labels or medicinal tapers. In one or more embodiments, a release liner may also be employed, if desired.

In one or more embodiments of the present invention, adhesive tapes may be formed which comprise a substrate coated with one or more adhesive compositions as described herein. As used herein, the term "tape" is meant generically to encompass any manner of adhesive application including, but not limited to, tapes, labels, stickers, decals, packaging applications, and the like.

Properties of the Adhesive Composition

In order to measure set time, substrate fiber tear, adhesive test specimens are created by bonding the substrates together with a dot of about 0.3 grams of molten adhesive and compressing the bond with a 500-gram weight. The dot size is controlled by the adhesive volume such that the compressed disk which forms gives a uniform circle just inside the dimensions of the substrates.

Set time (also referred to as adhesive set time or dot set time) is defined as the time it takes for a compressed adhesive substrate construct to fasten together enough to give substrate fiber tear when pulled apart, and thus, the bond is sufficiently strong to remove the compression. These set times are measured by trial and error by placing a molten dot of adhesive on to a file folder substrate (a typical manila letter size (⅓ cut) stock having a minimum of 10% post-consumer recycle paper content provided by Smead Paper, stock number 153L, UPC number 10330) taped to a flat table. Three seconds later, a file folder tab (2.5 cm×7.6 cm (1 inch by 3 inch)) is placed upon the dot and compressed with a 500-gram weight. The weight is allowed to sit for a predetermined time period from about 0.5 to about 10 seconds. The construct thus formed is pulled apart to check for a bonding level good enough to produce substrate fiber tear. The procedure is repeated several instances while holding the compression for different periods, and the set time is recorded as the minimum time required for this good bonding to occur. Standards are used to calibrate the process.

Once a construct is produced it can be subjected to various insults to assess the effectiveness of the bond. Once a bond to a substrate fails a simple way to quantify the effectiveness of the adhesive is to estimate the area of the adhesive dot that retained substrate fibers as the construct failed along the bond line. This estimate is called percent substrate fiber tear. An example of good adhesion, after conditioning a sample for 15 hours at 18° C. and attempting to destroy the bond, would be an estimate of 80% to 100% substrate fiber tear. It is likely that 0% substrate fiber tear under those conditions would signal a loss of adhesion.

The specimens for adhesion to a paper substrate for fiber tear testing are prepared using the same procedure as that described above. All substrate fiber tears were performed at conditions of 25° C., 2° C., and −18° C., wherein the specimens are aged at such conditions for about 12 hours. The bonds are separated by hand and a determination made as to the type of failure observed. The amount of substrate fiber tear is expressed herein as a percentage. All of the fiber tear tests are conducted using the paper substrate of a paperboard 84C (generic corrugated cardboard 200# stock provided by Huckster Packaging Supply, 6111 Griggs Road, Houston Tex. 77023).

Brookfield viscosity is measured using a Brookfield digital viscometer and a number 27 spindle according to ASTM D-3236 at either 177° C. or 190° C. (whichever temperature is specified).

Peak melting point ($T_m$), also referred to as melting point, peak crystallization temperature, ($T_c$), also referred to as crystallization temperature, glass transition temperature ($T_g$), heat of fusion ($\Delta H_f$ or $H_f$), and percent crystallinity were determined using the following differential scanning calorimetric (DSC) procedure (at second melt) according to ASTM D3418-03. DSC data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes then cooled to −90° C. at a rate of 10° C./minute, followed by an isothermal for 2 minutes and heating to 200° C. at 10° C./minute. Both the first and second cycle thermal events were recorded. Areas under the endothermic peaks of the second cycle were measured and used to determine the $T_c$, $T_m$, and $H_f$. The percent crystallinity is calculated using the formula, [area under the melting peak (Joules/gram)/B (Joules/gram)]*100, where B is the heat of fusion for the 100% crystalline homopolymer of the major monomer component. These values for B are obtained from $B_u$, H. S.; Cheng, S. Z. D.; Wunderlich, B. Makromol. Chem. Rapid Commun. 1988, 9, p. 75, that a value of 207 J/g (B) is used as the heat of fusion for 100% crystalline polypropylene and from Wunderlich, B. Macromolecular Physics, Volume 1, p. 388, Academic Press, 1973, that a value of 293 J/g is used for the heat of fusion for 100% crystalline polyethylene. The melting and crystallization temperatures as well as the glass transition temperature reported here were obtained during the second heating/cooling cycle unless otherwise noted.

Weight-average molecular weight, $M_w$, molecular weight distribution (MWD), or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranged from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mole, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$[K_o c/\Delta R(\theta,c)]=[1/MP(\theta)]+2A_2 c$$

where $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and $\lambda$=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_W$, is defined as the sum of the products of the molecular weight $M_i$ of each fraction multiplied by its weight fraction $w_i$:

$$M_W = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits.

The branching index g' is defined as:

$$g' = \frac{[\eta]_{avg}}{k M_v^\alpha}$$

where k=0.000579 and $\alpha$=0.695 for ethylene polymers; k=0.0002288 and $\alpha$=0.705 for propylene polymers; and k=0.00018 and $\alpha$=0.7 for butene polymers.

$M_V$ is the viscosity-average molecular weight based on molecular weights determined by the LS analysis:

$$M_V = (\Sigma c_i M_i^\alpha / \Sigma c_i)^{1/\alpha}$$

EXAMPLES

The following examples are illustrative of the invention.

The weight percent ethylene-derived units (wt. % $C_2$), of each propylene-ethylene random co-polymer (PEC), was determined by FTIR. The weight percent of the octene-derived units ($C_8$), the butene-derived units ($C_4$), and the propylene-derived units ($C_3$) of the ethylene-octene random copolymer ("EOC"), the ethylene-butene copolymer ("EBC"), and the ethylene-propylene copolymer ("EPC") were determined by $^{13}$C NMR. Weight-average molecular weights ($M_W$) were obtained by GPC-3D using the light scattering (LS) detector. The ratio of the weight-average molecular weight ($M_W$) over the number-average molecular weight ($M_n$), designated as $M_W/M_n$, was determined using a differential refractive index (DRI) detector. The g-prime (g') data were determined using a viscometer detector. BV denotes the Brookfield viscosity determined by ASTM D-3236. The glass transition temperature ($T_g$), the peak crystallization temperature ($T_c$), the peak melting point ($T_m$), and the heat of fusion ($H_f$) were determined as set forth above. Polymer densities at 23° C. were determined by the density column method according to ASTM D-1505-10.

Materials used in the preparation of the adhesive compositions as identified in the examples are as follows.

"EBC" is an ethylene-butene copolymer (an ethylene-based polymer) having the properties shown in Table 1.

"EPC" is an ethylene-propylene copolymer (an ethylene-based polymer) having the properties shown in Table 1.

"EOC-1" is an ethylene-octene random copolymer (an ethylene-based polymer) having the properties shown in Table 1. EOC-1 is Affinity GA 1900 which is available from the Dow Chemical Company.

"PEC-4", and "PEC-5" are propylene-ethylene random copolymers (a propylene-based polymer) having the properties shown in Table 2.

TABLE 1

|  | EBC | EPC | EOC-1 |
|---|---|---|---|
| Wt. % $C_2$ | 83 | 98.8 | 59 |
| Wt. % $C_3$ or $C_4$ or $C_8$ | 17 ($C_4$) | 1.2 ($C_3$) | 41 ($C_8$) |
| LS $M_w$, g/mole | 26,000 | 620 | 22,000 |
| DRI $M_w/M_n$ | 3.58 | 1.16 | 2.17 |
| g' | 0.967 | 0.588 | 0.921 |
| BV@190° C., mPa · sec | 33700 | 5 | 5412 |
| $T_g$, ° C. | <−73 | <−73 | −58 |
| $T_c$, ° C. | 78 | 90 | 52 |
| $T_m$, ° C. | 83 | 90 | 69 |

TABLE 1-continued

|  | EBC | EPC | EOC-1 |
|---|---|---|---|
| $H_f$, J/g | 41 | 209 | 47 |
| % Crystallinity | 14.0 | 71.3 | 16.0 |
| Density, g/cm³ | 0.8960 | 0.9221 | 0.8700 |
| $t_c$, ns | 917 | 0.0259 | 132 |

TABLE 2

|  | PEC-4 | PEC-5 |
|---|---|---|
| Wt. % $C_3$ | 94.6 | 89 |
| Wt. % $C_2$ | 5.4 | 11 |
| LS $M_w$, kg/mole | 21 | 32 |

TABLE 2-continued

|  | PEC-4 | PEC-5 |
|---|---|---|
| DRI $M_w/M_n$ | 3.35 | 3.04 |
| g' | 0.767 | 0.820 |
| BV@190° C., mPa·sec | 187 | 708 |
| $T_g$, ° C. | −14 | −23 |
| $T_c$, ° C. | 74 | 54 |
| $T_m$, ° C. | 108 | 96 |
| $H_f$, J/g | 53 | 46 |
| % Crystallinity | 25.6 | 22.2 |
| Density, g/cm³ | 0.8904 | 0.8785 |
| $t_c$, ns | 3.96 | 17.5 |

In terms of BV@190° C. for the ethylene-based polymers: EBC>EOC-1>EPC. In terms of BV@190° C. for propylene-based polymers: PEC-5>PEC-4. The EPC in Table 1 is very brittle and difficult to mold so that the densities shown in Table 1 are extrapolated values using the densities of PECs with various weight percentages of $C_2$ based on our data and data from Journal of Applied Polymer Science, Vol. 100, P. 1651-1658, 2006. In both Table 1 and Table 2, the characteristic time for each polymer was determined in accordance with Equation 1.

In addition to the base polymer(s), the hot melt adhesive ("HMA") formulations disclosed contain one or more of the following components: Escorez 5400, Polywax 3000, A-C 596P, and Irganox 1010.

"Escorez 5400", available from ExxonMobil Chemical Company, is a cycloaliphatic hydrocarbon tackifier resin having a ring and ball softening point from about 100° C. to about 106° C. and a density of about 1.00 g/cm³ at 23° C.

"Polywax 3000", available from Baker Petrolite, is a synthetic wax that is a fully saturated homopolymer of ethylene that has a high degree of crystallinity and a narrow molecular weight distribution. Its density is about 0.98 g/cm³. This synthetic wax has a narrow molecular weight distribution ($M_W$ of 3300 g/mole, $M_W/M_n$ of 1.10), a viscosity of 130 mPa·sec at a temperature of 149° C., a viscosity of 55 mPa·sec at a temperature of 190° C., a crystallization temperature of 115° C. and a melting temperature of 127° C. These and other properties of Polywax 3000 are shown in Table 3.

"A-C 596P" is a polypropylene-maleic anhydride copolymer from Honeywell, having a $M_W$ of 12,000 g/mole, $M_W/M_n$ of 2.18, viscosity at 190° C. of 128 mPa·sec, a crystallization temperature of 102° C., a melting temperature of 133° C., and Mettler drop point of 143° C. A-C 596P is available from Honeywell. These and other properties of A-C 596P are shown in Table 3.

Irganox 1010 is a phenolic antioxidant (stabilizer) having a melting point from about 110° C. to about 125° C. and a density (at 20° C.) of about 1.15 g/cm³. Irganox 1010 is available from Ciba Specialty Chemicals, Switzerland.

TABLE 3

|  | Wt. % $C_2$ | $M_w$ (kg/mole) | $M_w/M_n$ | Density, g/cm³ | BV@190° C. (mPa · sec) | $T_c$ (° C.) | $T_m$ (° C.) | $H_f$ (J/g) |
|---|---|---|---|---|---|---|---|---|
| Polywax 3000 | 100 | 3.3 | 1.15 | 0.98 | 55 | 115 | 127 | 293 |
| A-C 596P | 0 | 12 | 5.92 | 0.93 | 128 | 102 | 133, 143 | 64 |
| Irganox 1010 | 0 |  |  | 1.15 |  |  |  |  |

Examples 1-7

PEC-4+EOC-1

Hot melt adhesive formulations (HMAs) of a propylene-based polymer, PEC-4, were prepared, in which 80 wt. % PEC-4 was combined with an additive package comprised of Escorez 5400, Polywax 3000, A-C 596P, and Irganox 1010 at weight percentages of 8/8/3/1 was prepared (Sample 1). For comparison, additional HMAs in which PEC-4 is combined with the higher viscosity EOC-1, were prepared with the above additive package (Samples 2-6). A HMA based on an ethylene-based polymer, EOC-1 (80 wt. %) and the additive package (20 wt. %) was also prepared (Sample 7). Table 4 shows the composition and performance of these HMAs which are based on PEC-4 and the higher viscosity EOC-1, along with the comparative HMAs of PEC-4 alone (Sample 1) and EOC-1 alone (Sample 7). The HMA density at 23° C. was calculated based on the wt. % and the density of each component or ingredient of the HMA composition. The heat of fusion per unit volume, $H_f$ expressed in J/cm³, was calculated by multiplying $H_f$ expressed in J/g with the HMA density at 23° C. The HMA characteristic time ($t_c$) was calculated as the HMA Brookfield viscosity in mPa·sec at 177° C. divided by the product of HMA density at 23° C. and HMA $H_f$ in J/g. As can be seen, Examples 2-5 are good packaging HMAs because they have reasonably short set times, low Brookfield viscosities, and high fiber tear or adhesion properties at different test temperatures. Examples 1, 6 and 7, however, are not good packaging HMAs. Example 1 has low fiber tears or adhesion at different test temperatures. Example 7 has a set time longer than 3.5 seconds which is needed for good packaging HMAs. In Example 6, it can be seen that the incorporation of PEC-4 into EOC-1 did lower the HMA viscosity; however, this viscosity was not low enough for packaging HMA applications. The HMA of Example 6 may be suitable for use in applications with nonwovens, and in woodworking or other applications because low viscosity is not a critical property for these types of applications although the HMA set time cannot be too long. Good packaging HMAs require shorter set times and lower HMA viscosities, or both. If the term "Average % Fiber Tear" is defined by the following equation: Average % Fiber Tear=(% Fiber Tear at 25° C.+% Fiber Tear at 2° C.+% Fiber Tear at −18° C.)/3, then Examples 2-6 have Average % Fiber Tear greater than 99% and their set times are below 5.0 s. As noted from Table 4, Examples 2-6 are characterized by HMA density at 23° C. lower than about 0.9100 g/cm$^3$, HMA $t_c$ between about 15 ns and 100 ns, and HMA $H_f$ in J/cm$^3$ between about 19 and about 45.

Example 8. Table 5 shows the composition and performance of these HMAs which are based on PEC-5 and the higher viscosity EOC-1, along with the comparative HMAs of PEC-5 alone (Example 8) and EOC-1 alone (Example 7). As can be seen, Examples 9-11 are good HMAs which exhibited set time lower than 5 s and good fiber tear data or adhesion at different test temperatures with Average % Fiber Tear greater than 99%. Also, the incorporation of PEC-5 into EOC-1 lowered its viscosity. Example 9 is a good packaging HMA due to its lower Brookfield viscosity, while Examples 10-11 are not good packaging HMA because of their higher viscosities. However, they are suitable for use in applications with nonwovens, and in woodworking applications when low viscosity is not critical. As noted from Table 5, Examples 9-11 are characterized by HMA density at 23° C. lower than about 0.9100 g/cm$^3$, HMA $t_c$ between about 15 ns and 100 ns, and HMA $H_f$ in J/cm$^3$ between about 19 and about 45.

TABLE 4

| Example | 1 | 2 | 3 | 4 | 5 | 6 | 7 |
|---|---|---|---|---|---|---|---|
| PEC-4 | 80 | 56 | 48 | 40 | 32 | 24 | 0 |
| EOC-1 | — | 24 | 32 | 40 | 48 | 56 | 80 |
| Escorez 5400 | 8 | 8 | 8 | 8 | 8 | 8 | 8 |
| Polywax 3000 | 8 | 8 | 8 | 8 | 8 | 8 | 8 |
| A-C 596P | 3 | 3 | 3 | 3 | 3 | 3 | 3 |
| Irganox 1010 | 1 | 1 | 1 | 1 | 1 | 1 | 1 |
| PEC-4/EOC-1, Wt. Ratio | 100/0 | 70/30 | 60/40 | 50/50 | 40/60 | 30/70 | 0/100 |
| HMA Performance | | | | | | | |
| Brookfield Viscosity@177° C. (mPa · sec) | 223 | 585 | 773 | 1077 | 1480 | 1987 | 3675 |
| Set Time, seconds | 3.0 | 3.0 | 3.5 | 3.5 | 3.5 | 3.5 | 5.0 |
| % Fiber Tear, 25° C. | 0 | 100 | 98 | 100 | 100 | 100 | 93 |
| % Fiber Tear, 2° C. | 0 | 100 | 100 | 100 | 100 | 100 | 95 |
| % Fiber Tear, −18° C. | 0 | 100 | 100 | 100 | 100 | 100 | 96 |
| $T_c$, ° C. | 85, 110 | 66, 109 | 65, 109 | 54, 109 | 55, 109 | 55, 108 | 53, 107 |
| $T_m$, ° C. | 107, 120 | 106, 119 | 106, 119 | 104, 119 | 103, 119 | 103, 119 | 67, 118 |
| $H_f$, J/g | 65 | 34 | 38 | 32 | 27 | 27 | 17 |
| HMA Density, g/cm$^3$ | 0.9101 | 0.9052 | 0.9036 | 0.9020 | 0.9003 | 0.8987 | 0.8938 |
| $H_f$, J/cm$^3$ | 59 | 31 | 34 | 29 | 24 | 23 | 15 |
| HMA $t_c$, ns | 3.77 | 19.0 | 22.5 | 37.3 | 60.9 | 81.9 | 242 |

Examples 8-13

PEC-5+EOC-1

HMAs of propylene-based polymer, PEC-5, and ethylene-based polymer, EOC-1, were prepared (Examples 9-13). For comparison, an HMA based on PEC-5 (80 wt. %) combined with the above additive package (20 wt. %) was prepared as

TABLE 5

| Example | 8 | 9 | 10 | 11 | 12 | 13 | 7 |
|---|---|---|---|---|---|---|---|
| PEC-5 | 80 | 56 | 48 | 40 | 32 | 24 | 0 |
| EOC-1 | 0 | 24 | 32 | 40 | 48 | 56 | 80 |
| Escorez 5400 | 8 | 8 | 8 | 8 | 8 | 8 | 8 |
| Polywax 3000 | 8 | 8 | 8 | 8 | 8 | 8 | 8 |
| A-C 596P | 3 | 3 | 3 | 3 | 3 | 3 | 3 |
| Irganox 1010 | 1 | 1 | 1 | 1 | 1 | 1 | 1 |
| PEC-5/EOC-1 Wt. Ratio | 100/0 | 70/30 | 60/40 | 50/50 | 40/60 | 30/70 | 0/100 |
| HMA Performance | | | | | | | |
| Brookfield Viscosity@177° C. (mPa · sec) | 805 | 1380 | 1642 | 1927 | 2167 | 2550 | 3675 |
| Set Time, sec | 3.0 | 3.5 | 4.0 | 4.5 | 5.0 | 5.5 | 5.0 |
| % Fiber Tear, 25° C. | 97 | 100 | 100 | 100 | 100 | 100 | 93 |
| % Fiber Tear, 2° C. | 98 | 100 | 100 | 100 | 100 | 100 | 95 |
| % Fiber Tear, −18° C. | 100 | 100 | 100 | 100 | 100 | 100 | 96 |
| $T_c$, ° C. | 64, 110 | 56, 109 | 58, 109 | 45, 109 | 47, 109 | 52, 108 | 53, 107 |
| $T_m$, ° C. | 96, 121 | 96, 119 | 96, 119 | 96, 119 | 96, 119 | 96, 119 | 67, 118 |
| $H_f$, J/g | 23 | 25 | 21 | 27 | 23 | 20 | 17 |
| HMA Density, g/cm$^3$ | 0.9006 | 0.8986 | 0.8979 | 0.8972 | 0.8965 | 0.8958 | 0.8938 |
| $H_f$, J/cm$^3$ | 21 | 22 | 19 | 24 | 20 | 18 | 15 |
| HMA $t_c$, ns | 38.9 | 61.4 | 87.1 | 79.5 | 105 | 142 | 242 |

Examples 14-19

PEC-4+EBC

HMAs of propylene-based polymer, PEC-4, and ethylene-based polymer, EBC, were prepared (Examples 14-18). For comparison, an HMA based on EBC (80 wt. %) combined with the above additive package (20 wt. %) was prepared as Example 19. Table 6 shows the composition and performance of these HMAs which are based on PEC-4 and EBC, along with the comparative HMAs of PEC-4 alone (Example 1) and EBC alone (Example 19). As can be seen, the incorporation of PEC-4 into EBC lowered the viscosity of the HMA. However, these examples exhibited either set time equal to 5 s, Average % Fiber Tear lower than 99%, or both. These HMAs show densities at 23° C. higher than about 0.9100 g/cm³. They are not suitable for packaging HMA applications or for use in other applications, such as nonwoven, woodworking, etc.

Table 7 shows the composition and performance of these HMAs which are based on PEC-5 and EBC, along with the comparative HMAs of PEC-5 alone (Example 8) and EBC alone (Example 19). As can be seen, the incorporation of PEC-5 into EBC lowered the viscosity of the HMA. Although Examples 20-24 exhibit good fiber tears or adhesion at different test temperatures, they are not suitable for packaging HMA applications because of their high HMA viscosities and long set times. However, one of these HMAs, Example 20, is suitable for use in other applications, such as nonwoven, woodworking, etc., because short set time and low viscosity are not critical properties. Example 20 is a good HMA which exhibited set time lower than 5 s and good fiber tear data or adhesion at different test temperatures with Average % Fiber Tear greater than 99%. As noted from Table 7, it is characterized by HMA density at 23° C. lower than about 0.9100 g/cm³, HMA $t_c$ between about 15 ns and 100 ns, and HMA $H_f$ in J/cm³ between about 19 and about 45.

TABLE 6

| Example | 1 | 14 | 15 | 16 | 17 | 18 | 19 |
|---|---|---|---|---|---|---|---|
| PEC-4 | 80 | 56 | 48 | 40 | 32 | 24 | — |
| EBC | — | 24 | 32 | 40 | 48 | 56 | 80 |
| Escorez 5400 | 8 | 8 | 8 | 8 | 8 | 8 | 8 |
| Polywax 3000 | 8 | 8 | 8 | 8 | 8 | 8 | 8 |
| A-C 596P | 3 | 3 | 3 | 3 | 3 | 3 | 3 |
| Irganox 1010 | 1 | 1 | 1 | 1 | 1 | 1 | 1 |
| PEC-4/EBC, Wt. Ratio | 100/0 | 70/30 | 60/40 | 50/50 | 40/60 | 30/70 | 0/100 |
| HMA Performance | | | | | | | |
| Brookfield Viscosity@177° C. (mPa · sec) | 223 | 818 | 1262 | 1670 | 3165 | 10060 | 25350 |
| Set Time, sec | 3.0 | 4.5 | 4.5 | 4.5 | 5.0 | 5.0 | 5.0 |
| % Fiber Tear, 25° C. | 0 | 0 | 1.0 | 0 | 80 | 98 | 95 |
| % Fiber Tear, 2° C. | 0 | 0 | 3.3 | 53 | 100 | 100 | 60 |
| % Fiber Tear, · 18° C. | 0 | 0.7 | 4.0 | 42 | 97 | 100 | 83 |
| $T_c$, ° C. | 85, 110 | 68, 109 | 69, 109 | 71, 108 | 72, 108 | 70, 109 | 77, 108 |
| $T_m$, ° C. | 107, 120 | 104, 120 | 104, 120 | 86, 118 | 83, 119 | 86, 120 | 81, 119 |
| $H_f$ J/g | 65 | 58 | 52 | 46 | 48 | 42 | 57 |
| HMA Density, g/cm³ | 0.9101 | 0.9115 | 0.9119 | 0.9124 | 0.9128 | 0.9133 | 0.9146 |
| $H_f$ J/cm³ | 58 | 53 | 47 | 42 | 44 | 38 | 52 |
| HMA $t_c$, ns | 3.77 | 15.5 | 26.6 | 39.8 | 72.2 | 262 | 486 |

Examples 20-24

PEC-5+EBC

HMAs of propylene-based polymer, PEC-5, and ethylene-based polymer, EBC, were prepared (Examples 20-24).

Examples 21-24 are not good HMAs which exhibited set times equal to 6.0 s, although they have excellent fiber tear data or adhesion at different test temperatures with Average % Fiber Tear equal to 100%. This is due to the reason that either their HMA $H_f$ values in J/cm³ are higher than 45, their HMA $t_c$ values are longer than 100 ns, or both.

TABLE 7

| Example | 8 | 20 | 21 | 22 | 23 | 24 | 19 |
|---|---|---|---|---|---|---|---|
| PEC-5 | 80 | 56 | 48 | 40 | 32 | 24 | 0 |
| EBC | 0 | 24 | 32 | 40 | 48 | 56 | 80 |
| Escorez 5400 | 8 | 8 | 8 | 8 | 8 | 8 | 8 |
| Polywax 3000 | 8 | 8 | 8 | 8 | 8 | 8 | 8 |
| A-C 596P | 3 | 3 | 3 | 3 | 3 | 3 | 3 |
| Irganox 1010 | 1 | 1 | 1 | 1 | 1 | 1 | 1 |
| PEC-5/EBC, Wt. Ratio | 100/0 | 70/30 | 60/40 | 50/50 | 40/60 | 30/70 | 0/100 |
| HMA Performance | | | | | | | |
| Brookfield Viscosity@177° C. (mPa · sec) | 805 | 2180 | 3185 | 4290 | 9162 | 15850 | 25350 |
| Set Time, sec | 3.0 | 4.5 | 6.0 | 6.0 | 6.0 | 6.0 | 5.0 |
| % Fiber Tear, 25° C. | 97 | 100 | 100 | 100 | 100 | 100 | 95 |
| % Fiber Tear, 2° C. | 98 | 100 | 100 | 100 | 100 | 100 | 60 |

TABLE 7-continued

| Example | 8 | 20 | 21 | 22 | 23 | 24 | 19 |
|---|---|---|---|---|---|---|---|
| % Fiber Tear, −18° C. | 100 | 100 | 100 | 100 | 100 | 100 | 83 |
| $T_c$, ° C. | 64, 110 | 62, 109 | 62, 109 | 65, 109 | 66, 109 | 70, 106 | 77, 108 |
| $T_m$, ° C. | 96, 121 | 95, 120 | 93, 120 | 92, 119 | 87, 119 | 84, 117 | 81, 119 |
| $H_f$, J/g | 23 | 48 | 52 | 43 | 54 | 33 | 57 |
| HMA Density, g/cm³ | 0.9006 | 0.9048 | 0.9062 | 0.9076 | 0.9090 | 0.9104 | 0.9146 |
| $H_f$, J/cm³ | 21 | 43 | 47 | 38 | 49 | 30 | 52 |
| HMA $t_c$, ns | 38.9 | 50.2 | 67.6 | 110 | 187 | 528 | 486 |

Examples 25-28

PEC-4 or PEC-5+EPC

HMAs of propylene-based polymer, PEC-4, and ethylene-based polymer, EPC, were prepared (Examples 25-27). Table 8 shows the composition and performance of these HMAs which are based on PEC-4 and EPC, along with the comparative HMA of EPC alone (Example 28).

HMAs of propylene-based polymer, PEC-5, and ethylene-based polymer, EPC, were prepared (Examples 29-31). Table 9 shows the composition and performance of these HMAs which are based on PEC-5 and EPC, along with the comparative HMA of EPC alone (Example 28). As can be seen from the data in Tables 8 and 9, the incorporation of the very low viscosity EPC into PEC-4 and PEC-5 resulted in low HMA viscosity. However, these HMA are not good for packaging, nonwoven or wood-working applications, because these HMAs exhibit no fiber tears or no adhesion at various test temperatures. This may be due to EPC having very low viscosity and very high heat of fusion ($H_f$) producing a very short characteristic time, $t_c$, of 0.0259 ns for this ethylene-based polymer as shown in Table 1. Without being bound by theory, it is believed that EPC migrates to the HMA surface because it has very low molecular weight and very high crystallinity relative to the PEC. In other words, EPC is not compatible with PEC-4 or PEC-5. Also, all the examples in Tables 8 and 9 have HMA density at 23° C. greater than 0.9100 g/cm³, HMA $t_c$ shorter than 15 ns, and HMA $H_f$ in J/cm³ greater than 45.

TABLE 8

| | Example | | | |
|---|---|---|---|---|
| | 25 | 26 | 27 | 28 |
| PEC-4 | 72 | 64 | 56 | 0 |
| EPC | 8 | 16 | 24 | 80 |
| Escorez 5400 | 8 | 8 | 8 | 8 |
| Polywax 3000 | 8 | 8 | 8 | 8 |
| A-C 596P | 3 | 3 | 3 | 3 |
| Irganox 1010 | 1 | 1 | 1 | 1 |
| PEC-4/EBC, Wt. Ratio | 90/10 | 80/20 | 70/30 | 0/100 |
| HMA Performance | | | | |
| Brookfield Viscosity@ 177° C. (mPa · sec) | 193 | 155 | 98 | 7.5 |
| Set Time, sec | 1.5 | 1.5 | 1.25 | 10+ |
| % Fiber Tear, 25° C. | 0 | 0 | 0 | 0 |
| % Fiber Tear, 2° C. | 0 | 0 | 0 | 0 |
| % Fiber Tear, −18° C. | 0 | 0 | 0 | 0 |
| $T_c$, ° C. | 76, 109 | 71, 86, 107 | 68, 86, 107 | 86, 97 |
| $T_m$, ° C. | 90, 107, 120 | 90, 104, 120 | 88, 100, 118 | 90, 110 |
| $H_f$, J/g | 77 | 79 | 92 | 183 |
| HMA Density, g/cm³ | 0.9127 | 0.9152 | 0.9177 | 0.9355 |
| $H_f$, J/cm³ | 70 | 72 | 84 | 171 |
| HMA $t_c$, ns | 2.75 | 2.14 | 1.16 | 0.044 |

TABLE 9

| | Example | | | |
|---|---|---|---|---|
| | 29 | 30 | 31 | 28 |
| PEC-5 | 72 | 64 | 56 | 0 |
| EPC | 8 | 16 | 24 | 80 |
| Escorez 5400 | 8 | 8 | 8 | 8 |
| Polywax 3000 | 8 | 8 | 8 | 8 |
| A-C 596P | 3 | 3 | 3 | 3 |
| Irganox 1010 | 1 | 1 | 1 | 1 |
| PEC-5/EBC, Wt. Ratio | 90/10 | 80/20 | 70/30 | 0/100 |
| HMA Performance | | | | |
| Brookfield Viscosity@177° C. (mPa · sec) | 668 | 445 | 293 | 7.5 |
| Set Time, sec | 2.0 | 2.5 | 2.0 | 10+ |
| % Fiber Tear, 25° C. | 0 | 0 | 0 | 0 |
| % Fiber Tear, 2° C. | 0 | 0 | 0 | 0 |
| % Fiber Tear, −18° C. | 0 | 0 | 0 | 0 |
| $T_c$, ° C. | 70, 85, 109 | 68, 85, 108 | 65, 84, 106 | 86, 97 |
| $T_m$, ° C. | 88, 120 | 87, 119 | 89, 119 | 90, 110 |
| $H_f$, J/g | 57 | 63 | 87 | 183 |
| HMA Density, g/cm³ | 0.9041 | 0.9076 | 0.9111 | 0.9355 |
| $H_f$, J/cm³ | 51 | 57 | 79 | 171 |
| HMA $t_c$, ns | 13.0 | 7.78 | 3.70 | 0.044 |

All the blends of ethylene-based and propylene-based polymers used in the adhesive composition of the Examples above have a characteristic time ($t_c$) within the range of 0.1-10,000 nanoseconds (Tables 4-9). The only exception is EPC, which yields unacceptable HMA performance in these blends.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An adhesive composition comprising:
   (a) an ethylene-based polymer comprising more than 50 wt. % of ethylene-derived units and in the range of 1 wt. % to 49 wt. % of units derived from a first comonomer, said ethylene-based polymer having a Brookfield viscosity of at least 250 mPa·sec measured by ASTM D-3236 at 190° C., a heat of fusion of less than about 250 J/g measured by ASTM D-3418-03, wherein the weight percent measurements are based on the weight of the ethylene-based polymer;
   (b) a propylene-based polymer comprising more than 50 wt. % propylene-derived units and in the range of 1 wt. % to 49 wt. % of units derived from a second comonomer, said propylene-based polymer having a Brookfield viscosity in the range from 100 mPa·sec to 1500 mPa·sec measured by ASTM D-3236 at 190° C., a heat of fusion of at least 45 J/g measured by ASTM D-3418-03, wherein the weight percent measurements are based on the weight of the propylene-based polymer;
   wherein said ethylene-based polymer and said propylene-based polymer each have a characteristic time ($t_c$) of at least 0.1 nanoseconds, said characteristic time ($t_c$) in units of nanoseconds is defined by Equation 1:

$$t_c = \frac{BV}{\text{Density} \times \text{Heat of Fusion}} \quad \text{(Equation 1)}$$

wherein said BV is the Brookfield viscosity of said ethylene-based polymer or said propylene-based polymer measured by ASTM D-3236 at 190° C. in units of mPa·sec, said Density is the density of said ethylene-based polymer or said propylene-based polymer measured by ASTM D-1505-10 at 23° C. in units of g/cm³, and said Heat of Fusion is the heat of fusion of said ethylene-based polymer or said propylene-based polymer measured by ASTM D-3418-03 in units of J/g.

2. The adhesive composition of claim 1, wherein said first comonomer is selected from the group consisting of propylene, a $C_4$ to $C_{20}$ alpha-olefin, and combinations thereof.

3. The adhesive composition of claim 2, wherein said first comonomer comprises propylene, butene or octene.

4. The adhesive composition of claim 1, wherein said Brookfield viscosity measured by ASTM D-3236 at 190° C. of said ethylene-based polymer is from 250 to 50,000 mPa·sec.

5. The adhesive composition of claim 1, wherein said heat of fusion measured by ASTM D-3418-03 of said ethylene-based polymer is from 20 to 250 J/g.

6. The adhesive composition of claim 1, wherein said characteristic time ($t_c$) of said ethylene-based polymer is from 1 to 1000 nanoseconds.

7. The adhesive composition of claim 1, wherein said ethylene-based polymer has a ratio of a weight-average molecular weight ($M_w$) to a number-average molecular weight ($M_n$) in the range from 1 to 10.

8. The adhesive composition of claim 1, wherein said second comonomer is selected from the group consisting of ethylene, a $C_4$ to $C_{20}$ alpha-olefin, and combinations thereof.

9. The adhesive composition of claim 8, wherein said second comonomer comprises ethylene.

10. The adhesive composition of claim 1, wherein said heat of fusion measured by differential scanning calorimetry of said propylene-based polymer is from 45 to 75 J/g.

11. The adhesive composition of claim 1, wherein said characteristic time ($t_c$) of said propylene-based polymer is from 1 to 100 nanoseconds.

12. The adhesive composition of claim 1, wherein said first comonomer and said second comonomer are the same or different.

13. The adhesive composition of claim 1, further comprising one or more additives, said additives selected from the group consisting of a functionalized component, a tackifier component, a process oil component, a wax component, an antioxidant component, or a mixture thereof.

14. The adhesive composition of claim 13, wherein said adhesive composition has one or more of the following properties:
   (i) a Brookfield viscosity of 250 to 10,000 mPa·sec measured by ASTM D-3236 at 177° C.;
   (ii) an Average percent Fiber Tear greater than 99%, wherein Average percent Fiber Tear is defined by: Average percent Fiber Tear=(percent Fiber Tear at 25° C.+percent Fiber Tear at 2° C.+percent Fiber Tear at −18° C.)/3;
   (iii) an adhesion set time of less than 5 seconds;
   (iv) a melting temperature ($T_m$) of 130° C. or less measured by differential scanning calorimetry at second melt with a heating rate of 10° C./min;
   (v) a calculated density of said adhesive composition at 23° C. lower than about 0.9100 g/cm³, wherein said calculated density is determined from the weight percent and the density of each component is said adhesive composition;
   (vi) a heat of fusion ($H_f$) of said adhesive composition of about 19 J/g to about 45 J/g; and/or
   (vii) a hot melt adhesive characteristic time (HMA $t_c$) from about 15 nanoseconds to about 100 nanoseconds, said HMA characteristic time (HMA $t_c$) defined by:

$$\text{HMA } t_c = \frac{BV \text{ at } 177° \text{ C.}}{\text{Density} \times \text{Heat of Fusion}}$$

wherein said BV is the Brookfield viscosity of said adhesive composition measured by ASTM D-3236 at 177° C. in units of mPa·sec, said Density is the calculated density of said adhesive composition at 23° C. in units of g/cm³, and said Heat of Fusion is the heat of fusion of said adhesive composition measured by ASTM D-3418-03 in units of J/g.

* * * * *